United States Patent
Usui et al.

(10) Patent No.: US 6,851,723 B2
(45) Date of Patent: Feb. 8, 2005

(54) RING JOINT, CONNECTION STRUCTURE FOR CONNECTING PIPING AND RING JOINT, AND METHOD OF CONNECTING RING JOINT AND PIPING

(75) Inventors: Masayoshi Usui, Numazu (JP); Shu Yotsumoto, Shizuoka-ken (JP)

(73) Assignee: Usui Kokusai Sangyo Kaisha, Ltd., Shizuoka-ken (JP)

( * ) Notice: Subject to any disclaimer, the term of this patent is extended or adjusted under 35 U.S.C. 154(b) by 0 days.

(21) Appl. No.: 10/253,850

(22) Filed: Sep. 24, 2002

(65) Prior Publication Data

US 2003/0062721 A1 Apr. 3, 2003

(30) Foreign Application Priority Data

Sep. 28, 2001 (JP) ........................................ 2001-303355
Sep. 9, 2002 (JP) ........................................ 2002-263006

(51) Int. Cl.⁷ ............................................... F16L 27/00
(52) U.S. Cl. .................... 285/190; 285/288.1; 285/319; 285/222.4; 285/423; 285/21.1
(58) Field of Search ................................. 285/195, 190, 285/288.1, 288.5, 23, 319, 222.4, 423, 21.1, 21.3

(56) References Cited

U.S. PATENT DOCUMENTS

| | | | | | |
|---|---|---|---|---|---|
| 3,967,838 | A | * | 7/1976 | Legris | 285/190 |
| 4,708,375 | A | * | 11/1987 | Sauer | 285/258 |
| 4,993,455 | A | * | 2/1991 | Yanagisawa | 137/592 |
| 5,011,192 | A | * | 4/1991 | Campo | 285/23 |
| 5,533,764 | A | * | 7/1996 | Williamson | 285/212 |
| 5,533,765 | A | * | 7/1996 | Williamson et al. | 285/212 |
| 5,573,279 | A | * | 11/1996 | Rea et al. | 285/21.1 |
| 5,923,819 | A | * | 7/1999 | Ross et al. | 392/441 |
| 6,007,109 | A | * | 12/1999 | Schoetz | 285/190 |
| 6,199,916 | B1 | * | 3/2001 | Klinger et al. | 285/288.1 |
| 6,530,604 | B1 | * | 3/2003 | Luft et al. | 285/190 |

FOREIGN PATENT DOCUMENTS

| | | |
|---|---|---|
| JP | 51-113812 | 9/1976 |
| JP | 60-5190 | 2/1985 |
| JP | 60-5192 | 2/1985 |
| JP | 64-048632 | 2/1989 |
| JP | 3192682 | 11/1992 |
| JP | 04-344847 | 12/1992 |
| JP | 04-357388 | 12/1992 |
| JP | 06-241372 | 8/1994 |
| JP | 08-105579 | 4/1996 |

* cited by examiner

Primary Examiner—David Bochna
(74) Attorney, Agent, or Firm—Jordan and Hamburg LLP

(57) ABSTRACT

Connection structure for connecting a piping used in automobiles or the like to a ring joint for providing highly reliable gas-tightness. The ring joint includes a ring joint body including a fitting hole for an eyebolt, the fitting hole being piercingly formed in an axial core portion of the ring joint body and in continuation from an annular recessed groove formed inside the ring joint body, and a flow path extending in a direction perpendicular to and intersecting with the fitting hole. A branch pipe is formed as a unitary body with the ring joint body and arranged in a direction perpendicular to and intersecting with the eyebolt. A piping for insertion into the branch pipe has an outer peripheral surface covered with resin, and the resin of the outer peripheral surface of the piping and an inner peripheral surface of the branch pipe are fixedly welded to one another.

18 Claims, 16 Drawing Sheets

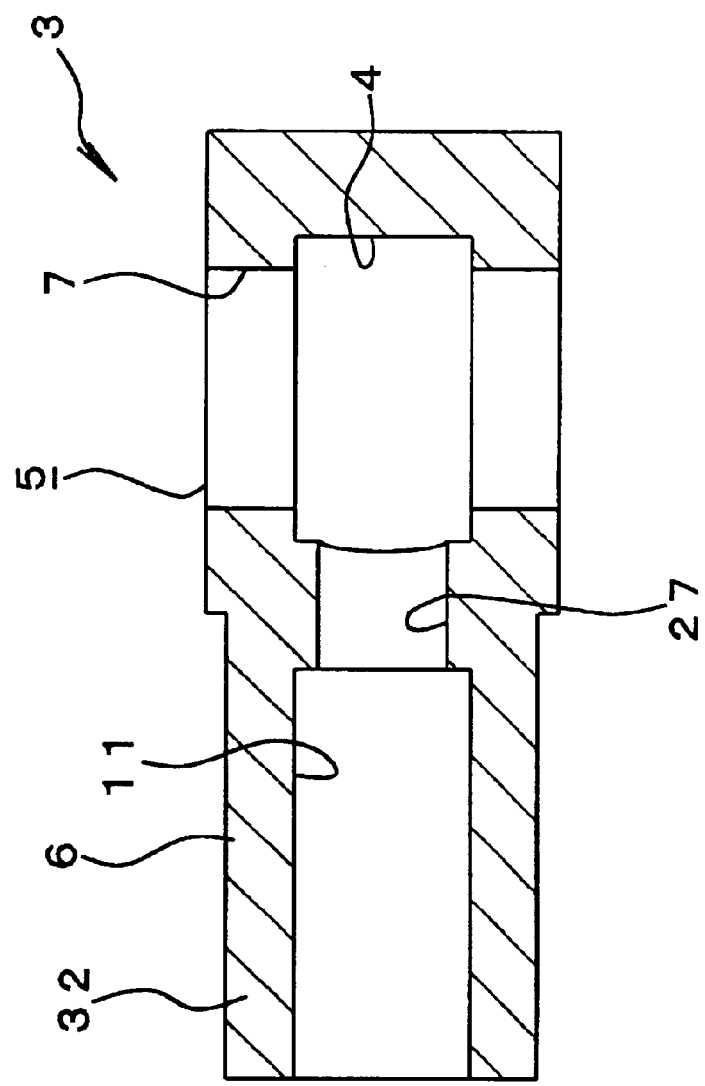
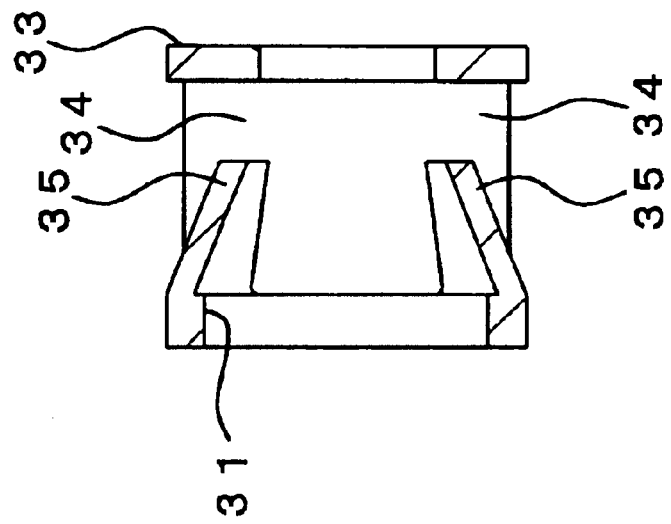
Fig.13

RING JOINT, CONNECTION STRUCTURE FOR CONNECTING PIPING AND RING JOINT, AND METHOD OF CONNECTING RING JOINT AND PIPING

BACKGROUND OF THE INVENTION

1. Field of the Invention

This invention relates to a ring joint for attaching a piping used in automobiles, various machines, and apparatuses, etc. to a base member in a perpendicularly intersected manner; a connection structure for connecting a ring joint and a piping; and a method of connecting a ring joint and a piping; by which the ring joint and the piping can be connected inexpensively with a simple connecting method, a highly reliable gas-tightness and disengagement resistance can be obtained, and the ring joint can be formed easily.

2. Description of Related Art

Conventionally, a metal ring joint is generally used as a joint in connecting a piping used for automobiles, various machines and apparatuses (more particularly, for flowing fuel, air, lubricants or the like used in automobiles) to a base member in a perpendicularly intersecting manner when arranging the piping to a floor panel or a front panel or the like. The ring joint, for example, has a spherical shaped ring joint body formed by cold forging a steel material, and a branch pipe for inserting a piping therethrough formed at the side surface of the ring joint body in a manner projecting in a direction perpendicularly intersecting with an eyebolt. An inner portion of the ring joint body and an inner portion of the branch pipe are then processed to form a flow path for allowing fluid communication, e.g., fuel, therebetween. The ring joint and the piping are connected by inserting the piping into the branch pipe of the ring joint, and then by brazing a tip of the branch pipe and the outer peripheral surface of the piping.

Conventionally, processing the ring joint and connecting the ring joint with the piping, however, requires a complicated technique of skillful work, numerous manufacture steps and expensive manufacture cost. Flux or the like used during the brazing procedure affects the work environment, the human body, etc. Use of a rust-proofed, e.g., galvanized, piping in the brazing procedure causes the heat during the brazing to exfoliate the galvanized coat. Accordingly, a piping initially with no rustproofing is employed and is rust-proofed, e.g., galvanized after the brazing procedure, thereby, requiring more manufacture steps.

For example, as shown in Japanese utility model publication No. Showa 60-5190, a product simplifying the manufacture process by using resin for forming the ring joint is known. In the prior art, a branch pipe and a piping are connected by contacting a flared piping to a seat side of the tip of a branch pipe, and then by tightening the piping and the branch pipe with a connecting nut from an outer periphery thereof. With the prior art, no brazing procedure for connecting the ring joint and the piping is required, a rust-proofed piping can be employed, and neither the work environment or the human body will be adversely affected. However, since the prior art employs a metal nut to fuse and fix the outer periphery of the branch pipe, the piping is required to be flared and plastic deformed for contacting to the seat side of the tip of the branch pipe, thereby requiring much labor and skill in manufacturing the piping. The prior art also requires much labor in assembly since numerous components, e.g., metal connecting nut, are necessary.

It is an object of this invention to solve the foregoing problems by forming a ring joint with resin for obtaining an inexpensive product with excellent processability. This invention can also connect a surface treated (e.g., rust-proofed) metal piping or a resin piping to a ring joint by resin welding, thereby allowing easy connection between a ring joint and a piping. This invention can also provide highly reliable gas-tightness and disengagement resistance. This invention can also provide an easy and safe method for connecting a ring joint and a piping, prevent adverse effects to the work environment, and ensure safety to the human body. This invention allows a ring joint having highly reliable gas-tightness and disjoint-resistance to be manufactured easily with a simple structure, thereby increasing productivity.

SUMMARY OF THE INVENTION

In solving the foregoing problems, the first invention is a ring joint having: a ring joint body including: a fitting hole for an eyebolt, the fitting hole being piercingly formed in an axial core portion of the ring joint body and in continuation from an annular recessed groove formed inside the ring joint body, and a flow path communicating with the fitting hole and extending in a direction perpendicularly intersecting with an axial core of the fitting hole; and a branch pipe formed as a united body with the ring joint body and disposed in a direction perpendicularly intersecting with the eyebolt for insertion to the annular recessed groove, wherein the ring joint is formed of resin at least at the branch pipe, wherein the ring joint can be connected with a piping by inserting the piping into the branch pipe of the ring joint body, wherein the piping has an outer peripheral surface covered with resin at least at a portion contacting to the branch pipe, and wherein the piping is fixedly welded to an inner peripheral surface of the branch pipe via the resin of the outer peripheral surface of the piping by a welding means.

The second invention is a connection structure for connecting a ring joint and a piping having: a ring joint body including: a fitting hole for an eyebolt, the fitting hole being piercingly formed in an axial core portion of the ring joint body and in continuation from an annular recessed groove formed inside the ring joint body, and a flow path communicating with the fitting hole and extending in a direction perpendicularly intersecting with an axial core of the fitting hole; and a branch pipe formed as a united body with the ring joint body and disposed in a direction perpendicularly intersecting with the eyebolt for insertion to the annular recessed groove, wherein the ring joint is formed of resin at least at the branch pipe, wherein the ring joint can be connected with a piping by inserting the piping into the branch pipe of the ring joint body, wherein the piping has an outer peripheral surface covered with resin at least at a portion contacting to the branch pipe, and wherein the piping is fixedly welded to an inner peripheral surface of the branch pipe via the resin of the outer peripheral surface of the piping by a welding means.

The third invention is a method of connecting a ring joint and a piping including the steps of: inserting a piping having resin formed on an outer periphery thereof, into a branch pipe of a ring joint body; and fixedly welding the resin disposed on the outer periphery of the piping with the branch pipe formed of resin by applying a welding means from an outer peripheral surface of the branch pipe, whereby the ring joint body and the piping are connected.

The fourth invention is a connection structure for connecting a ring joint and a piping having: a ring joint body having: a fitting hole for an eyebolt, the fitting hole being piercingly formed in an axial core portion of the ring joint body and in continuation from an annular recessed groove formed inside the ring joint body, and a flow path communicating with the fitting hole and extending in a direction perpendicularly intersecting with an axial core of the fitting hole; and a piping having a branch pipe fixed to an end portion of the piping by molding, wherein the branch pipe formed of resin is fixedly welded to the ring joint body by a welding means in a direction perpendicularly intersecting with the eyebolt, and wherein the eyebolt is connected to the annular recessed groove of the ring joint body.

The fifth invention is a method of connecting a ring joint and a piping including the steps of: fixing a branch pipe to an end portion of the piping by molding, the branch pipe being formed of resin; and fixedly welding the ring joint body and the branch pipe by contacting and disposing a welding surface of the branch pipe to a welding surface of a side surface of the ring joint body in a direction perpendicularly intersecting with an eyebolt and then by applying a welding means thereto, wherein the eyebolt is inserted and connected to the annular recessed groove, and whereby the ring joint body is connected to the piping.

The sixth invention is ring joint having: a ring joint body including: a fitting hole for an eyebolt, the fitting hole being piercingly formed in an axial core portion of the ring joint body, and a flow path communicating with the fitting hole and extending in a direction perpendicularly intersecting with an axial core of the fitting hole; and a branch pipe formed as a united body with an outer peripheral surface of the ring joint body and disposed in a direction perpendicularly intersecting with the axial core of the fitting hole, wherein the branch pipe is in communication with the flow path, wherein the ring joint body can be connected with a piping by inserting the piping into the branch pipe of the ring joint body, wherein the piping has resin formed at an outer peripheral surface of an insertion portion of the piping, wherein the branch pipe has resin formed at an inner peripheral surface of the branch pipe contacting to the outer peripheral surface of the insertion portion of the piping, wherein the branch pipe has an engagement nail formed at an inner surface thereof as a united body or as a separate body with respect to the branch pipe, wherein the engagement nail serving as a disengagement prevention means for the piping is engaged to an annular protruded portion, wherein the annular protruded portion is formed on the outer peripheral surface of the piping at a prescribed distance from a tip of the insertion portion, and wherein the resin of the inner peripheral surface of the branch pipe and the resin of the outer peripheral surface of the piping are fixedly welded by a welding means.

The seventh invention is a connection structure for connecting a ring joint and a piping having: a ring joint body including: a fitting hole for an eyebolt, the fitting hole being piercingly formed in an axial core portion of the ring joint body, and a flow path communicating with the fitting hole in a direction perpendicularly intersecting with an axial core of the fitting hole; and a branch pipe formed as a united body with an outer peripheral surface of the ring joint body and disposed in a direction perpendicularly intersecting with the axial core of the fitting hole, the branch pipe communicating with the flow path, wherein the ring joint body can be connected with a piping by inserting the piping into the branch pipe of the ring joint body, wherein the piping has resin formed at an outer peripheral surface of an insertion portion of the piping, wherein the branch pipe has resin formed at an inner peripheral surface of the branch pipe contacting to the outer peripheral surface of the insertion portion of the piping, wherein the branch pipe has an engagement nail formed at an inner surface thereof, as a united body or as a separate body with respect to the branch pipe, wherein the engagement nail serving as a disengagement prevention means for the piping is engaged to an annular protruded portion, formed on the outer peripheral surface of the piping at a prescribed distance from a tip of the insertion portion, and wherein the resin of the inner peripheral surface of the branch pipe and the resin of the outer peripheral surface of the piping are fixedly welded by a welding means.

The eight invention is a method of connecting a ring joint and a piping including the steps of forming a disengagement prevention means for a piping by inserting the piping into a branch pipe of a ring joint body and engaging an annular protruded portion of the piping with an engagement nail formed at an inner surface of the branch pipe, the piping having resin formed at an outer peripheral surface of an insertion portion of the piping, the annular protruded portion formed on the outer peripheral surface of the piping at a prescribed distance from a tip of the insertion portion, the engagement nail formed as a united body or as a separate body with respect to the branch pipe; and fixedly welding the resin of the branch pipe and the resin of the outer peripheral surface of the piping with a welding means, the resin of the branch pipe is formed at an inner peripheral surface of the branch pipe contacting to the outer peripheral surface of the insertion portion of the piping, whereby the ring joint body and the piping are connected.

The ninth invention is a connection structure for connecting a ring joint and a piping having: a ring joint body including: a fitting hole for an eyebolt, the fitting hole being piercingly formed in an axial core portion of the ring joint body, and a flow path communicating with the fitting hole and extending in a direction perpendicularly intersecting with an axial core of the fitting hole; and a piping having a disengagement prevention means by forming an annular protruded portion on an outer peripheral surface thereof in the side of the piping for connecting to the ring joint body, and by fixing a branch pipe to the outer peripheral surface including the annular protruded portion by molding, wherein the branch pipe formed with resin is fixedly welded to a resin welding surface of the ring joint body by a welding means in a direction perpendicularly intersecting with the axial core of the fitting hole and in communication with the flow path.

The tenth invention is a method of connecting a ring joint and a piping including the steps of: forming a disengagement prevention means for the piping by fixing a resin branch pipe to an outer peripheral surface of the piping by molding, the outer peripheral surface including an annular protruded portion disposed in the side of the piping for connecting to the ring joint body; and fixedly welding the ring joint body to the resin branch pipe by contacting and disposing the resin branch pipe to a resin welding surface of the ring joint body in a direction perpendicularly intersecting with an axial core of fitting hole for an eyebolt and in communication with a flow path.

In the first, second, and third invention where the ring joint body is molded, the ring joint body is formed as a united body with the branch pipe beforehand. In the method of connecting a metal or resin piping, e.g., piping for automobiles, various machines and apparatuses, to a base member via the ring joint in a perpendicularly intersecting manner, the piping is first inserted into the branch pipe of the ring joint. Since the piping has resin disposed at least on an outer peripheral portion thereof whereat the piping and the branch pipe make contact, the insertion of the piping allows the branch pipe and the piping to contact at the resin portion.

The resin of the outer peripheral portion of the piping and the branch pipe are then fixedly welded to each other by applying a suitable welding means from the outer surface of the branch pipe. The ring joint and the piping can be easily, inseparably, and firmly connected by welding the resin portion, thereby providing excellent gas-tightness. It is to be noted that by using a means, for example, ultrasonic vibration welding with heat or high-frequency induction welding with heat, as the welding means for welding the resin, only the contacting portion between the branch pipe and the piping will be subject to ultrasonic energy or high-frequency energy. Accordingly, a safe and easy connection process can be ensured without excessive overheating or the like. The resin of the branch pipe is welded to the resin tube or the resin coating of the outer periphery of the piping by applying pressure from the outer portion of the branch pipe to the connecting portion when the resin is formed into a molten or semi-molten state by the ultrasonic energy or the high-frequency energy, thereby enabling the branch pipe and the metal piping to be connected firmly.

The method of connecting the ring joint and the piping by the welding of resin requires no high skill technique, simplifies the manufacture process, and provides firm connection between the ring joint and the piping with excellent gas-tightness. Since brazing is not required for the connection, a piping which is rust-proofed, e.g., galvanized, resin-coated, can be used for eliminating a rust-proofing process subsequent to the connection of the ring joint and the piping, and the connection process can be performed safely with no use of material harmful to the work environment or to the human body and with no creation of hazardous gases or the like.

The ring joint having the piping connected thereto is arranged to the base member, and the eyebolt is inserted into the fitting hole and connected to the base member, thereby connecting the piping and the base member via the ring joint. Since the ring joint and the piping are connected firmly with excellent endurance and gas-tightness, fluid such as liquid or air can be prevented from leaking and can flow smoothly between the base member and the piping in a perpendicularly intersecting direction via the ring joint.

Since the piping made from metal requires resin to be disposed at the outer periphery thereof for welding with the branch pipe, a resin tube or a resin coating can be cohered to the outer peripheral surface of the piping. In fitting the resin tube to the piping or in coating the piping with the resin coating, the resin and the piping is to be inseparably adhered to each other by heat welding or the like. An inexpensive product can be provided by disposing the resin tube or the resin coating only at the contacting portion between the outer periphery of the piping and the branch pipe. Piping covered entirely with a resin tube or a resin coating is generally sold as a product of an inexpensive price. Accordingly, the resin coating of the piping can be used in welding with the branch pipe to eliminate the process of disposing the resin to the piping, thereby simplifying the manufacture process while acquiring the rust-proof property of the metal piping at the same time.

A resin piping, which has a metal tube disposed to the inner peripheral surface of the insertion portion for insertion to the branch pipe, may also be used as the piping. The resin piping can allow easy welding to the branch pipe, and the metal tube can increase the strength of the insertion portion and heighten the endurance of the connection structure.

In the ring joint of the fourth and fifth inventions, the ring joint body and the branch pipe are formed separately. In the first process of connecting the ring joint and the piping, for example, a rust-proofed metal piping has a tip portion thereof fixed to a resin branch pipe by molding. By employing the molding method, the branch pipe and the piping can be easily, inseparably and firmly connected with a highly reliable gas-tightness.

In the second process, the branch pipe is contacted and arranged to the ring joint body in a direction perpendicularly intersecting with the eyebolt. A welding means, e.g., ultrasonic vibration welding with heat or high frequency induction welding with heat, is applied to the contacting portion to allow the branch pipe to be fixedly welded to the side surface of the ring joint body. By fixedly welding the branch pipe, the ring joint and the piping can be firmly connected via the branch pipe, an excellent gas-tightness can be provided, and the connecting process can be performed easily and safely.

It is to be noted that a resin piping, which has a metal tube disposed to the inner peripheral surface of the insertion portion for insertion to the branch pipe, may also be used instead of the rust-proofed metal piping.

Subsequent to fixedly welding the ring joint body and the branch pipe in the fourth and fifth inventions, a resin material may be seal welded at the outer periphery of the welding surface of the ring joint body and the branch pipe for further increasing the connection strength between the ring joint and the branch pipe, for preventing disengagement between the ring joint and the branch pipe, and for heightening not only the disengagement resistance between the ring joint and the branch pipe but also the reliability of gas-tightness.

In the ring joint of the sixth, seventh, and eighth invention, the ring joint body and the branch pipe are molded into a united body. In the method of connecting the ring joint and the piping, the piping is first inserted into the branch pipe formed as a united body with the ring joint body. The insertion allows the resin disposed in the outer peripheral surface of the insertion portion of the piping to contact with the resin disposed in the inner peripheral surface of the branch pipe, and also allows the annular protruded portion of the piping, which is arranged at a prescribed distance from the tip of the piping, to engage with the engagement nail of the branch pipe, thereby serving as a disengagement prevention means for preventing the piping from disengaging from the branch pipe.

The resin of the outer peripheral surface of the insertion portion and the resin of the inner peripheral surface of the branch pipe are fixedly welded by applying a suitable welding means from the outer surface of the branch pipe to the contacting portion between the insertion portion of the piping and the branch pipe, thereby completing the connection process of the ring joint body and the piping. The connection structure between the ring joint body and the piping provides highly reliable gas-tightness by welding the resin between the ring joint and the piping. Although disengagement between the piping and the ring joint can be prevented solely by the welding of resin, the disengagement prevention means formed by the engagement of the engagement nail and the annular protruded portion increases disengagement resistance for effectively preventing the ring joint from disengaging from the piping. The excellent disengagement resistance of the engagement nail prevents the piping from moving in an axial direction thereof and prevents the branch pipe of the ring joint and the piping from separating at the welding portion for maintaining a highly reliable gas-tightness. Accordingly, the piping and the base member connected in a perpendicularly intersecting manner via the ring joint enable fluid to flow smoothly therebetween without leakage or the like.

It is to be noted that by using a method, for example, ultrasonic vibration welding with heat or high-frequency induction welding with heat as the welding means for welding the resin of the branch pipe and the resin of the piping in the sixth, seventh and eighth invention, only the contacting portion between the branch pipe and the piping will be subject to ultrasonic energy or high-frequency energy. Accordingly, a safe and easy connection process can be ensured without excessive overheating or the like. The welding between the resin of the inner peripheral surface of the branch pipe and the resin of the outer peripheral surface of the piping is strengthened by applying pressure from the outer portion of the branch pipe to the connecting portion when the resin is formed into a molten or semi-molten state by the ultrasonic energy or the high-frequency energy, thereby further enhancing the endurance of the connection.

An entire portion or a portion of the contacting portion between the inner peripheral surface of the branch pipe and the outer peripheral surface of the piping can be formed with resin. The resin of the entire portion or a portion of the contacting portion can be welded by welding the resin between the inner peripheral surface of the branch pipe and the outer peripheral surface of the piping.

Connection of highly reliable gas-tightness and disengagement resistance can be provided with no high skill technique required, and the efficiency in the connection process can be enhanced by only inserting the piping into the branch pipe of the ring joint and applying the welding means to the contacting portion. Since brazing is not required for the connection, a rust proofed (e.g., galvanized, resin-coated) piping can be used for eliminating a rust-proofing procedure subsequent to the connection of the ring joint and the piping, and the connection process can be performed safely with no use of material harmful to the work environment or to the human body and with no creation of hazardous gases or the like. The ring joint, which is connected to the piping with excellent gas-tightness and disengagement resistance, can be formed with a simple structure comprised of the branch pipe having the inner peripheral surface thereof made from resin, and the engagement nail, thereby increasing productivity of the ring joint.

Although the disengagement prevention means having the engagement nail can be molded to form a united body with the branch pipe, the metal mold for the ring joint having the branch pipe formed thereto can be simplified by forming the disengagement prevention means and the body of the branch pipe separately; thereby increasing productivity of the ring joint. Separately forming the metal mold for the disengagement prevention means allows the disengagement prevention means to be removed easily from the metal mold after the molding of the engagement nail, thereby enabling the disengagement prevention means including the engagement nail to be formed with ease and with higher manufacture precision. The separately formed disengagement prevention means is then connected and fixed to a side of the branch pipe by a method such as welding with a welding means or engaging a component thereto, thereby simplifying the connection process between the branch pipe and disengagement prevention means.

In the case where the separately formed branch pipe and the disengagement prevention means are connected by welding resin, a resin material can be seal welded at the outer periphery of the welding portion for further increasing the connection strength and the gas-tightness between the branch pipe and the disengagement prevention means and for further heightening the reliability of disengagement resistance of the disengagement prevention means.

The piping of the sixth, seventh, and eighth invention, which is a metal piping having the annular protruded portion formed thereto, may also have the resin tube or the resin coating cohered thereto for welding the outer periphery of the metal piping to the branch pipe. Using a product in which the metal piping is covered entirely with the resin tube or the resin coating can increase cost-effectiveness and efficiency in the connection process while at the same time acquire the excellent rustproof property of the metal piping covered with resin.

However, the sixth, seventh and eighth inventions and the first, second, and third inventions is not always required to have the resin tube or the resin coating cohered to the entire outer peripheral surface of the metal piping. As long as contact with the resin of the inner peripheral surface of the branch pipe is possible for enabling welding, the resin tube or the resin coating can instead be disposed only at the outer peripheral surface of the insertion portion of the piping or be disposed at a portion of the outer peripheral surface of the insertion portion, e.g., in the proximity of the tip of the piping. As long as contact with resin of the is possible for enabling welding, the entire portion of the inner peripheral surface of the branch pipe or a single portion of the inner peripheral surface can be formed with resin. In cohering the resin tube or the resin coating to the metal piping, the resin and the piping is to be inseparably adhered to each other, for example, by welding or by use of an adhesive agent.

The branch pipe of the ring joint can be easily welded with strong connecting strength by using the resin piping in the sixth, seventh, and eighth inventions. By arranging the metal tube in the inner peripheral surface of the insertion portion of the resin piping and by arranging the annular protruded portion on the outer periphery of the resin piping including the metal tube, the annular protruded portion for engaging with the engagement nail can have more durability and provide a highly reliable disengagement resistance.

In the ninth and tenth inventions, the ring joint has the ring joint body and the branch pipe formed separately. The ring joint body and the branch pipe are fixedly welded in the connection process where at least the welding surface of the ring joint body for welding with the branch pipe is formed with resin. In the first process of connecting the ring joint and the piping, the annular protruded portion is formed in a projecting manner at the outer peripheral surface of the piping on the side for connection with the ring joint body, and the resin branch pipe is formed and fixed to the outer peripheral surface of the piping including the annular protruded portion by molding.

By forming and fixing the branch pipe to the piping, the piping and the branch pipe are connected firmly having a highly reliable gas-tightness at the connecting portion therebetween. The disengagement prevention means capable of preventing disengagement between the branch pipe and the piping with a highly reliable disengagement resistance can be provided by burying the annular protruded portion of the piping into the resin of the piping.

In the second process, the branch pipe is contacted and disposed upon the resin welding surface of the ring joint body in a direction perpendicularly intersecting with the axial core of the fitting hole of the eyebolt and in communication with the flow path. Applying the welding means to the contacting portion allows the branch pipe to fixedly welded to the side surface of the ring joint body, thereby completing the connection between the ring joint and the piping via the branch pipe. Accordingly, the ninth and tenth inventions enables a safe and easy connection process between the ring joint and the piping and provides a connection structure having highly reliable gas-tightness and disengagement resistance.

Subsequent to fixedly welding the ring joint body and the branch pipe in the ninth and tenth inventions, a resin material may be seal welded at the outer periphery of the welding surface of the ring joint body and the branch pipe for further increasing the connection strength, for preventing disengagement between the ring joint and the branch pipe, and for heightening not only the disengagement resistance between the ring joint and the branch pipe but also the reliability in gas-tightness.

The ninth and tenth inventions may employ the metal piping having the resin coating or resin tube cohered on the outer peripheral surface thereof, and may also employ the resin piping having the metal tube disposed on the inner peripheral surface of the insertion portion for insertion to the branch pipe. The branch pipe and the piping can be connected more firmly by welding the resin of the piping and the resin of the branch pipe. A metal piping having no resin disposed on the outer periphery thereof can be used in the ninth and tenth inventions since the branch pipe is formed and fixed to the outer periphery of the piping by molding. Accordingly, the connection structure having highly reliable gas-tightness and disengagement resistance can be provided inexpensively, and the connection structure and the connection method can be used widely for any kind of piping.

BRIEF DESCRIPTION OF THE DRAWINGS

The above and other objects and features of the invention are apparent to those skilled in the art from the following preferred embodiments thereof when considered in conjunction with the accompanied drawings, in which:

FIG. 13 is a cross-sectional view of the tenth embodiment showing a disengagement prevention portion formed separately with respect to the main body of a branch pipe;

DESCRIPTION OF THE PREFERRED EMBODIMENTS

Figure 1:
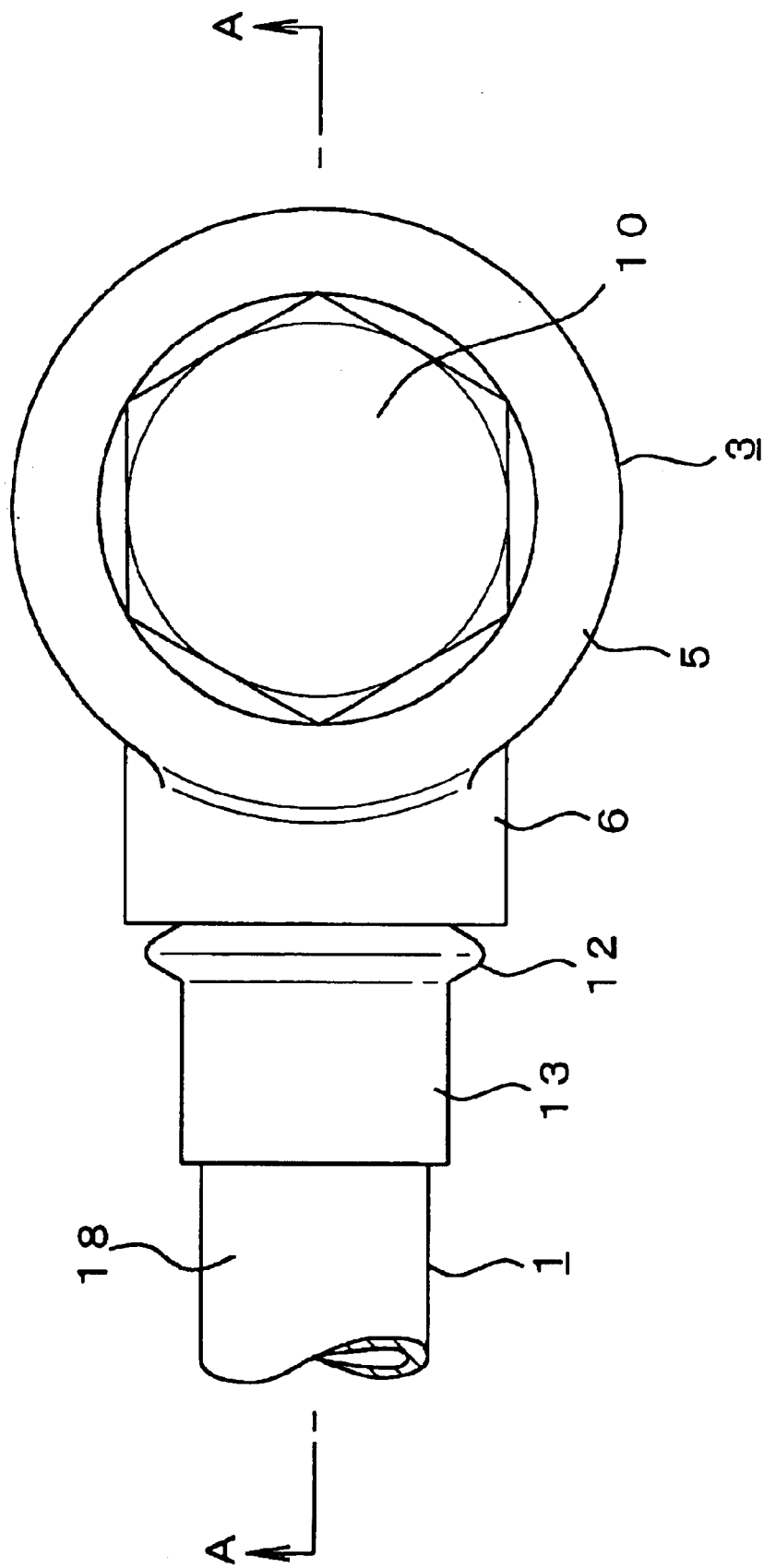
FIG. 1 is a plan view showing a connection structure of a ring joint and a piping of the first embodiment, in which a resin tube is fitted to the outer peripheral surface of the piping.
Figure 2:
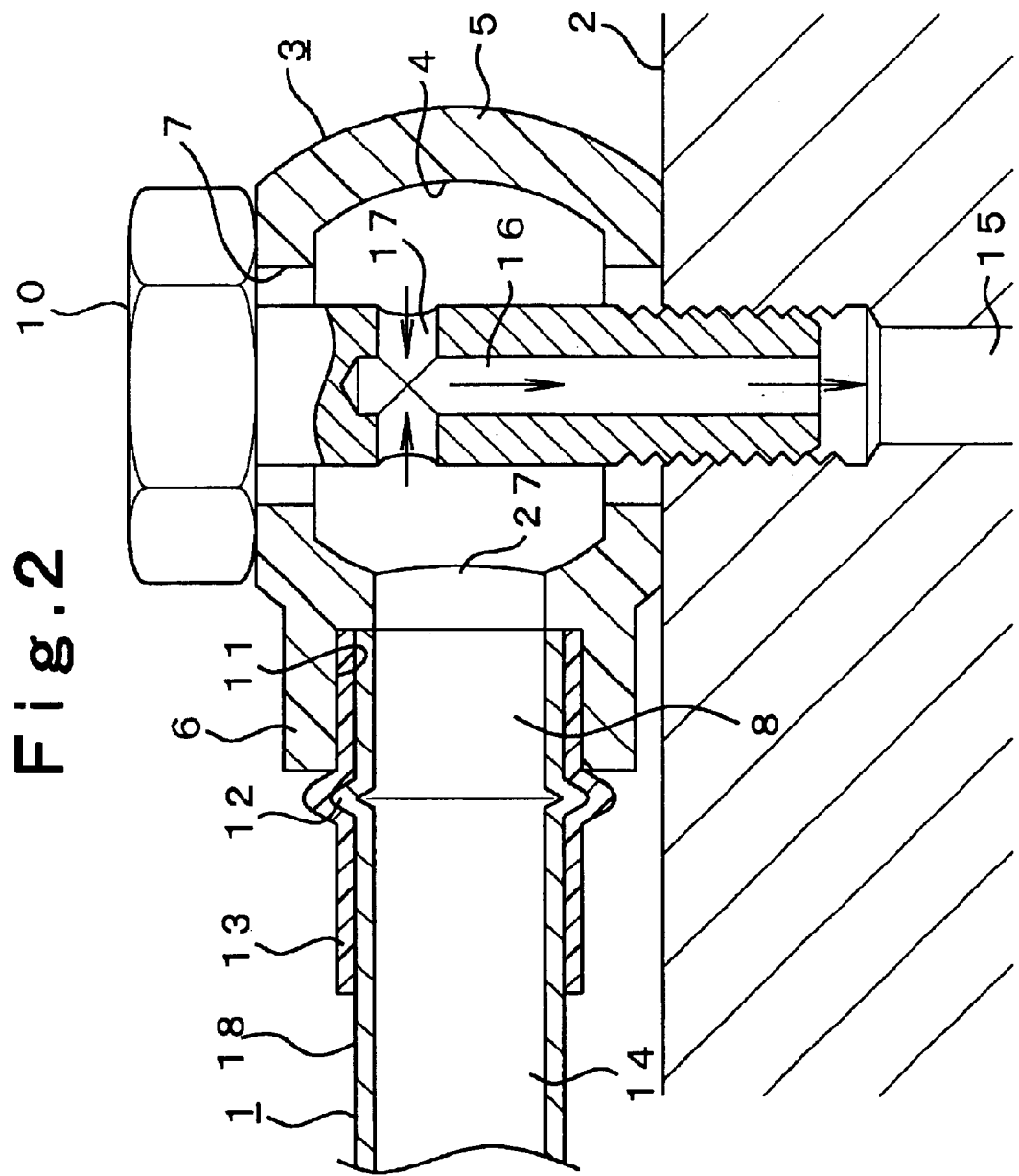
FIG. 2 is a cross-sectional view along line A—A of FIG. 1.
Figure 3:
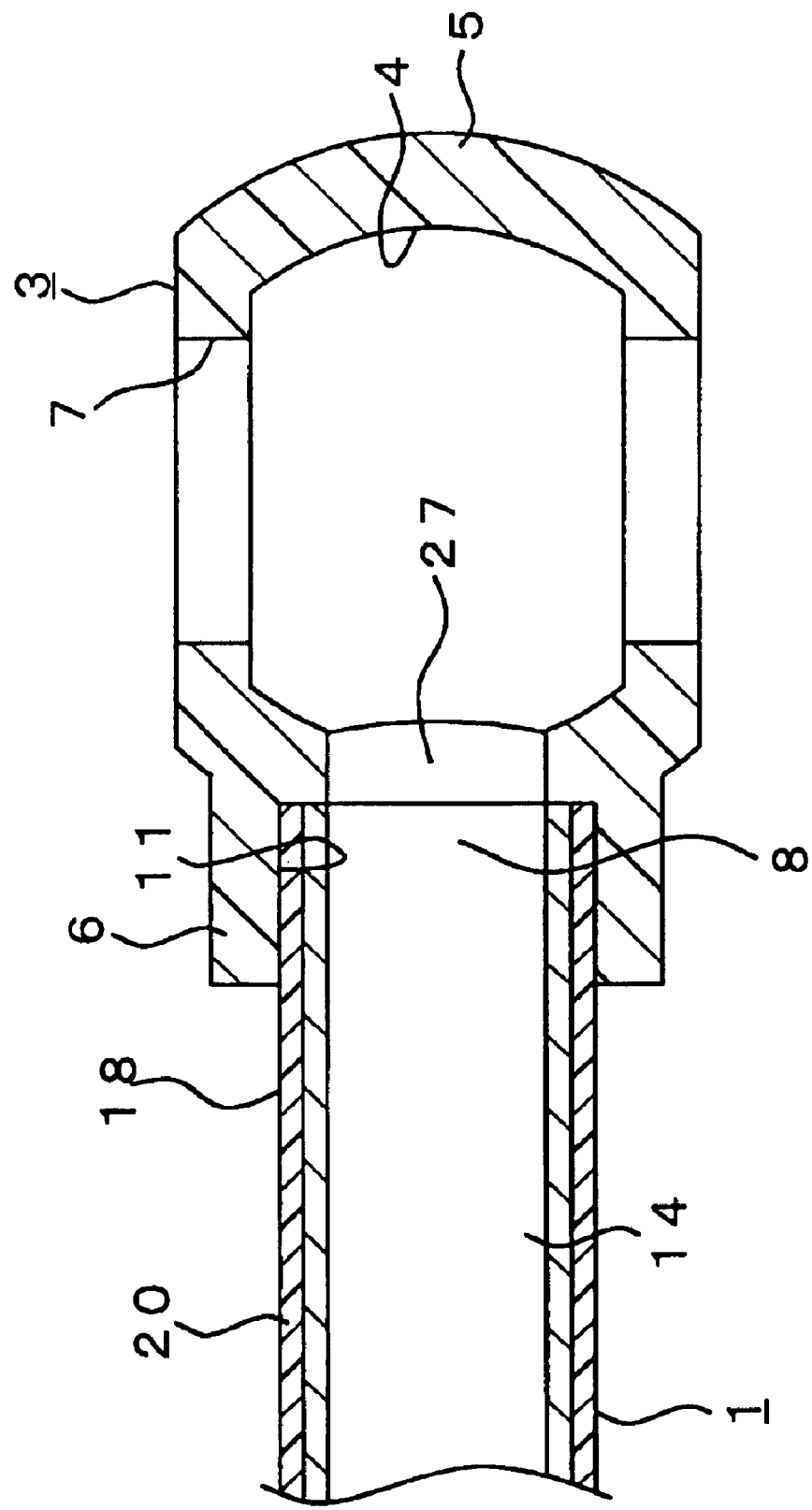
FIG. 3 is a cross-sectional view of the second embodiment showing an entire outer peripheral surface of a piping coated by a resin coating.
Figure 4:
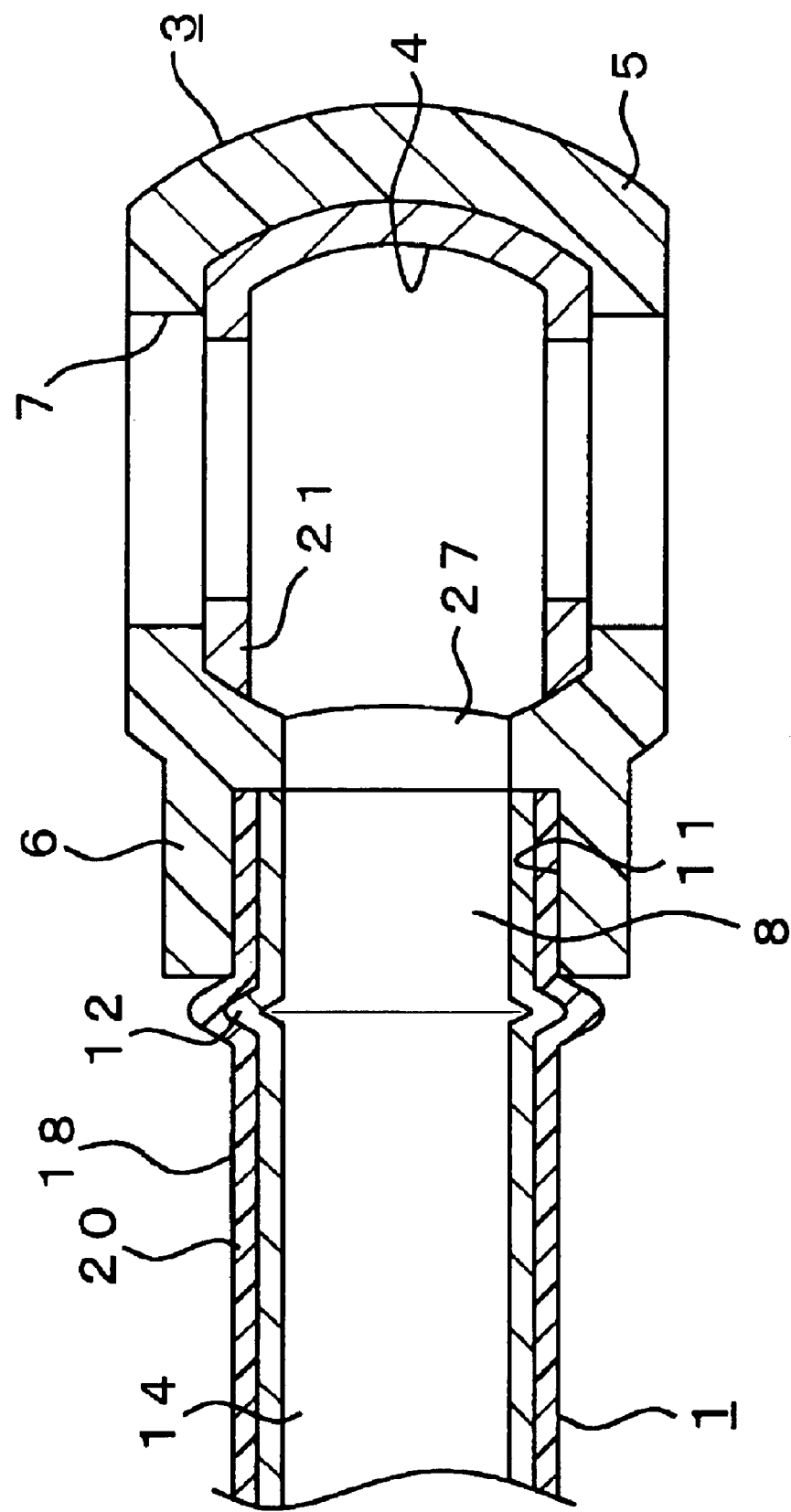
FIG. 4 is a cross-sectional view of the third embodiment showing the inside of a ring joint body reinforced with copper.
Figure 5:
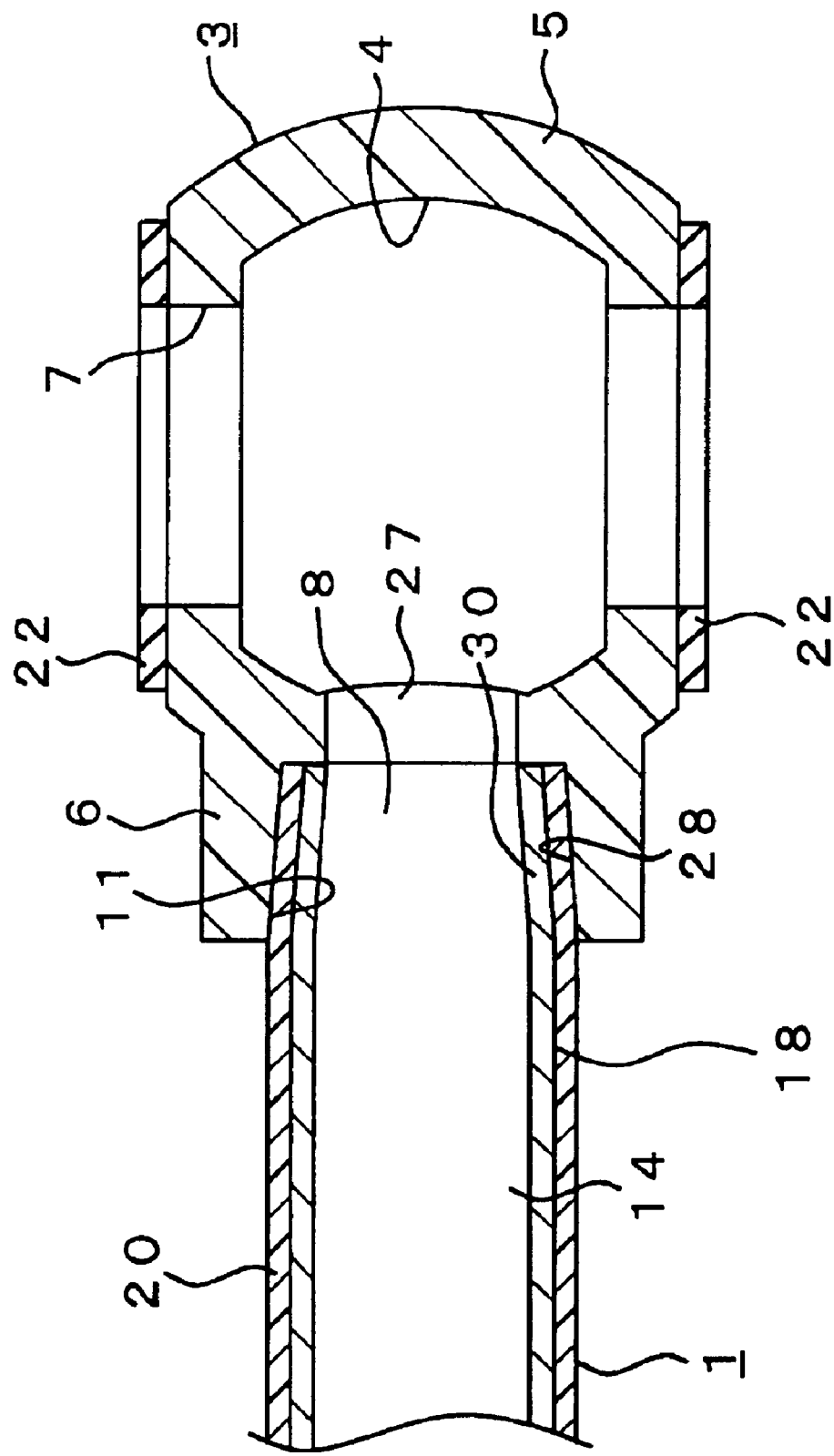
FIG. 5 is a cross-sectional view of the fourth embodiment showing a gasket arranged to an outer surface of a ring joint body.
Figure 6:
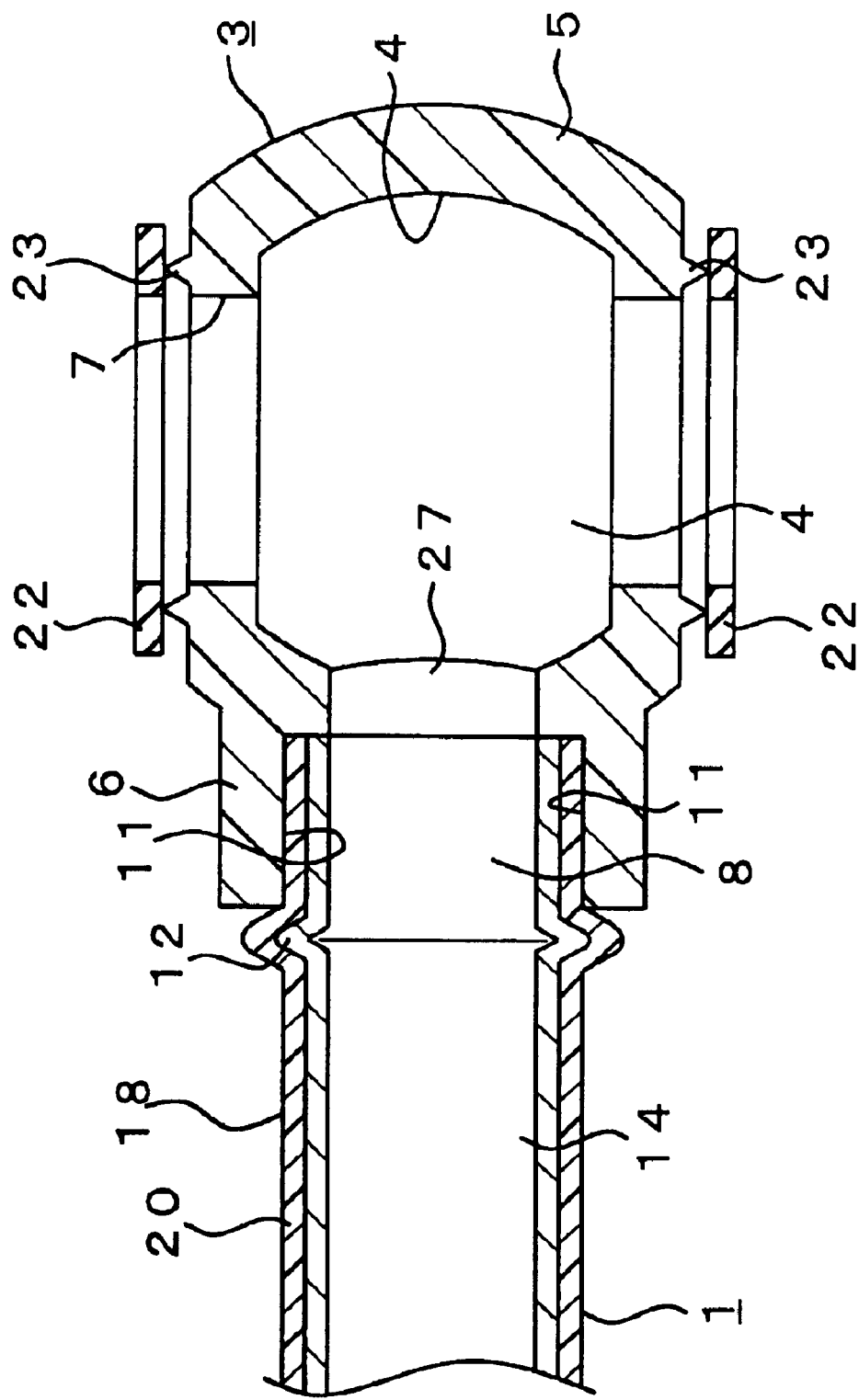
FIG. 6 is a cross-sectional view of the fifth embodiment showing an annular projection arranged to an outer periphery of a ring joint body in a projecting manner.
Figure 7:
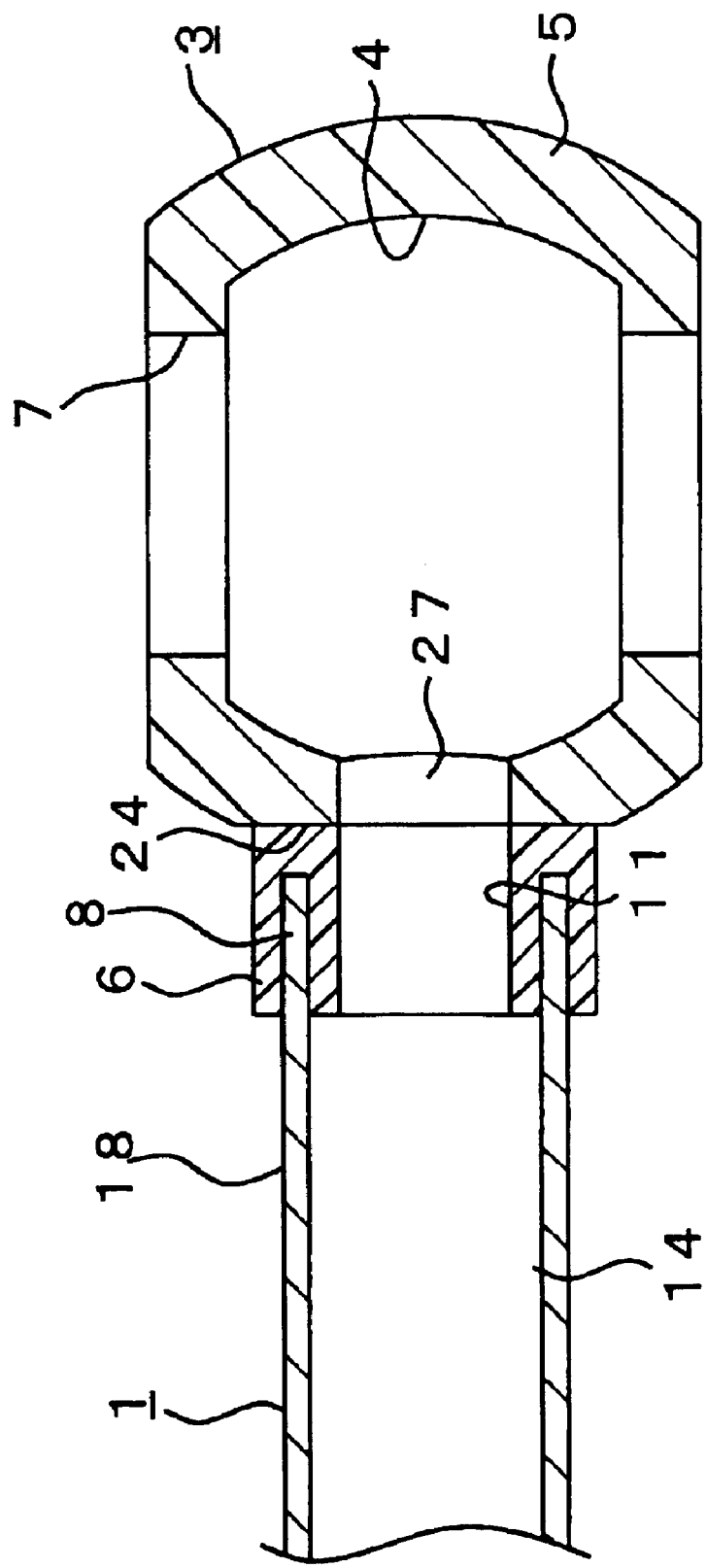
FIG. 7 is a cross-sectional view of the sixth embodiment showing a state where a piping with a resin branch pipe fixed thereto is fixedly welded to a ring joint body.
Figure 8:
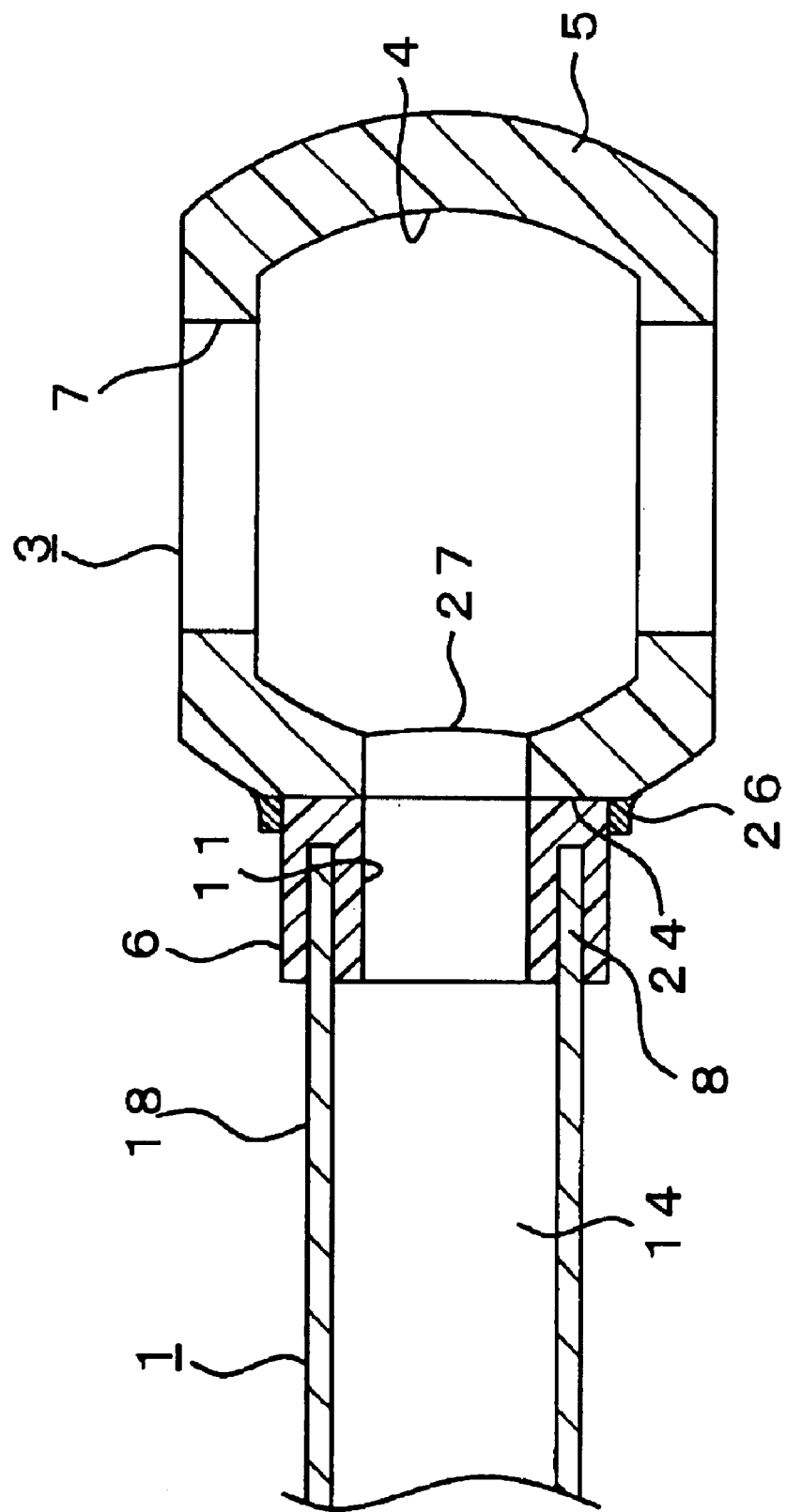
FIG. 8 is a cross-sectional view of the seventh embodiment showing a branch pipe fixedly welded to a ring joint body, and a resin material seal welded at the outer periphery of a welded side between the branch pipe and the ring joint body.

An embodiment of this invention will hereinafter be described in relation to a fluid supply mechanism of an automobile with reference to the drawings. FIG. 1 and FIG. 2 show the first embodiment, in which FIG. 1 is a plan view showing a connection structure of a ring joint and a piping of the first embodiment where a resin tube is fitted to the outer peripheral surface of the piping, and FIG. 2 is a cross-sectional view along line A—A of FIG. 1. FIG. 3 is a cross-sectional view of the second embodiment showing an entire outer peripheral surface of a piping coated by a resin coating, and FIG. 4 is a cross-sectional view of the third embodiment showing the inside of a ring joint body reinforced with copper. FIG. 5 is a cross-sectional view of the fourth embodiment showing a gasket arranged to an outer surface of a ring joint body and FIG. 6 is a cross-sectional view of the fifth embodiment showing an annular projection arranged to an outer periphery of a ring joint body in a projecting manner. FIG. 7 is a cross-sectional view of the sixth embodiment showing a state where a piping with a resin branch pipe fixed thereto is fixedly welded to a ring joint body, and FIG. 8 is a cross-sectional view of the seventh embodiment showing a branch pipe fixedly welded to a ring joint body, and a resin material seal welded at the outer periphery of a welded side between the branch pipe and the ring joint body.

FIG. 9 to FIG. 16 are cross-sectional views of the eighth embodiment to the twelfth embodiment showing a disengagement prevention means arranged to a ring joint body, respectively. The eighth embodiment shown in FIG. 9 and FIG. 10 has a ring joint welded to a united body of a branch pipe and a piping. The ninth embodiment shown in FIG. 11 and FIG. 12 has a piping with a tip thereof formed in a tapered manner. The tenth embodiment shown in FIG. 13 has a disengagement prevention means with an engagement nail formed separately with respect to the main body of a branch pipe, in which the disengagement prevention means is fixedly welded to the branch pipe. The eleventh embodiment shown in FIG. 14 has a clip member with an engagement nail formed in a separate manner with respect to the main body of a disengagement prevention portion, in which the clip member is connected to the branch pipe by means of engaging. The twelfth embodiment shown in FIG. 15 and FIG. 16 has a branch pipe fixed to a piping by molding, in which the branch pipe is then fixedly welded to a ring joint body.

The first embodiment will hereinafter be described in detail with reference to FIG. 1 and FIG. 2. Numeral 1 is a metal piping disposed at an floor panel, a front face panel or the like, which includes, for example, a fuel main pipe for supplying fuel from an fuel tank to an engine room, a fuel return pipe for returning surplus fuel from an engine to a fuel tank, an evaporation piping for enabling fuel vapor inside a fuel tank to adhere to a canister inside an engine room, a vacuum piping manipulating negative pressure of intake, an oil pipe, etc. The piping 1 is branched in a direction perpendicularly intersecting with the base member serving to flow fuel, air, or lubricants or the like for automobiles, and arranged to a side of the above-mentioned panel.

A connection structure and a connection method using a ring joint for connecting the piping 1 and the base member 2 in a branched and perpendicularly intersecting manner, are described in detail hereinafter. As shown in FIG. 1 and FIG. 2, the ring joint 3 has an annular recessed groove 4 arranged inside a ring joint body 5 having a spherical shape. A fitting hole 7 for an eyebolt 10 is arranged at an axial core portion and in continuation with the annular recessed groove 4. A flow path 27 is arranged in continuation with the fitting hole 7 in a direction perpendicularly intersecting with an axial core of the fitting hole 7.

The ring joint body 5 is formed as a united body with a branch pipe 6. As shown in FIG. 2, the branch pipe 6 having a cylindrical shape is formed in a projecting manner from the side of the ring joint body 5 and disposed in communication with the flow path 27 in a direction perpendicularly intersecting with the axial core of the fitting hole 7. Molding the ring joint body 5 and the branch pipe 6 as a united body simplifies molding and processing of the ring joint 3 to be simplified, reduces manufacture cost, and increases productivity.

As a first process for connecting the piping 1 to the base member 2 by using the ring joint 3, the piping 1, which is a metal pipe, is inserted into the branch pipe 6. A rust proofed, e.g., galvanized, piping 1 can be used in this invention since a brazing means is not required for connecting the piping 1 and the ring joint 3.

As shown in FIG. 2, a stopper spool 12 arranged slightly inward from the tip of the piping 1 for insertion into the branch pipe 6 is formed at the outer periphery of the piping 1 in a annularly projecting manner. A resin tube 13 is fitted to an outer peripheral surface 18 on the tip of the piping 1 including the stopper spool 12. The resin tube 13 made of a resin having a thermally contracting property is heated after being fitted to the piping 1 for enabling contraction, and is then easily cohered and fixed to the piping 1 in an separable state. Other welding means can also be employed according to circumstance or a means such as applying of adhesive agents can also be employed for fixing the resin tube 13 to the piping 1.

The piping 1 can be prevented from being excessively inserted into the branch pipe 6 since the tip of the branch pipe 6 protrudes against the stopper spool 12 of the piping 1 when an insertion portion 8 of the piping 1 is inserted into the branch pipe 6. The insertion allows an inner peripheral surface 11 of the branch pipe 6, which is made from resin, to make contact with the resin tube 13 on the outer peripheral surface 18 of the insertion portion 8 and also allows the annular recessed groove 4 of the ring joint body 5 to communicate with the fluid flow path 14 inside the piping 1.

As a second process, a welding means such as ultrasonic vibration welding with heat or high frequency induction welding with heat is applied from the outer surface of the branch pipe 6 to a contacting portion between the inner peripheral surface of the branch pipe 6 and the resin tube 13. For example, in a case of high-frequency induction welding with heat, the metal piping 1 is heated by high-frequency energy for forming the resin tube 13 of the outer periphery of the piping 1 into a molten or a semi-molten state. In such a state, pressure is applied from the outer surface of the branch pipe 6 to the contacting portion for fixedly welding the branch pipe 6 and the resin tube 13. Such welding allows the piping 1 to firmly connect with the ring joint 3 and provides highly reliable gas-tightness.

A lower surface of the ring joint 3 having the piping 1 connected thereto is then arranged in a manner contacting with an upper surface of the base member 2, as shown in FIG. 2. The eyebolt 10 is then inserted into the fitting hole 7 and arranged into the annular recessed groove 4. The tip of the eyebolt 10 is fixedly screwed to an inner periphery of the fluid flow path 15 of the base member 2, thereby, connecting the ring joint 3 and the base member 2. Since the ring joint 3 is made from a resin and has a moderate degree of flexibility, connection with excellent gas-tightness can be obtained.

As shown in FIG. 2, the eyebolt 10 has an internal bolt communication path 16 arranged therein in fluid communication with the fluid flow path 15 of the base member 2 and has plural internal bolt communication holes 17 opened in the outer periphery thereof for allowing communication between the internal bolt communication path 16 and the annular recessed groove 4. Accordingly, the fluid flow path 14 of the piping 1 and the fluid flow path 15 of the base member 2 can be in fluid communication via the internal bolt communication path 16 and the internal bolt communication hole 17 of the eyebolt 10 and the annular recessed groove 4 and the flow path 27 of the ring joint 3.

The connection structure between the ring joint 3 and the piping 1 of the first embodiment enables highly reliable gas-tightness for effectively preventing liquid leakage, air leakage or the like, and for enabling fuel, air, lubricants or the like to flow smoothly in a perpendicularly intersecting manner between the piping 1 and the base member 2 via the ring joint 3 as described by the arrows in FIG. 2. The employment of the ring joint 3, which is manufactured with a simple processing method with use of inexpensive resin, allows the base member 2 and the piping 1 to be connected with simple skill, thereby increasing productivity. The connection structure can ensure safety for the work environment and the human body since no brazing is required.

Although the resin tube 13 for welding is fitted only at the outer peripheral surface 18 of the tip portion of the piping 1 in the first embodiment, the second embodiment has a resin coating 20 entirely coating the outer peripheral surface 18 of the piping 1, as shown in FIG. 3. Although the resin coating 20 can be applied to the piping 1 in the connection process of the second embodiment, the second embodiment uses a ready-made piping 1 which is initially coated with the resin coating 20. The labor of resin coating can be excluded and a rust-proof effect can be provided to the piping 1 by using the resin coating 20 of the ready-made piping 1 as a welding means. Although the piping 1 in the first embodiment has the stopper spool 12 arranged thereto, the second embodiment has no stopper spool 12 formed thereto. Needless to say, the piping 1 of the second embodiment could be formed with the stopper spool 12 arranged thereto. The resin coating 20 could be coated only at the contacting portion with respect to the branch pipe 6.

Although the ring joint 3 of the first and second embodiments is entirely formed with resin only, the ring joint 3 of the third embodiment as shown in FIG. 4 has a reinforcement portion 21 arranged therein by adhering a steel plate to the entire inner surface of the ring joint body 5 for increasing the strength of the ring joint 3. Therefore, although the third embodiment may require more manufacture cost and labor compared to the first and second embodiments, endurance and gas-tightness of the ring joint 3 can be enhanced when connected to the base member 2.

In the first embodiment to the third embodiment, a gasket for tightening the eyebolt 10 is not necessarily required since the resin-made ring joint 3 provides gas-tightness by closely adhering to the surface of the eyebolt 10 and the base member 2 in a flexible manner. However, rubber-made gaskets or O-rings can be arranged on the outer surface on both sides of the fitting hole 7 as in the fourth embodiment shown in FIG. 5, thereby providing a more reliable gas-tightness with respect to the eyebolt 10 and the base member 2. The flexibility of the rubber-made gaskets 22 or the O-rings serve to maintain gas-tightness even in a case where the ring joint 3 is deformed from excessive tightening of the eyebolt 10 or from long term use. As shown in FIG. 5, the metal piping 1 and the branch pipe 6 may be welded by molding a tip of the piping 1 into a tapered pipe tip portion 30, forming the inner peripheral surface 11 of the branch pipe 6 into a tapered inner peripheral surface 28 having substantially the same slope as the tapered tip portion 30, engaging the tapered pipe tip portion 30 and the tapered inner peripheral surface 28, and applying axial force to the piping 1.

In the fifth embodiment shown in FIG. 6, the ring joint 5 has annular protrusions 23 formed at the portions contacting to the eyebolt 10 and the base member 2 for enhancing gas-tightness. Although the annular protrusions 23 as a sole can provide highly reliable gas-tightness when tightening the eyebolt 10, this embodiment as shown in FIG. 6 has gaskets 22 disposed on the surface of the annular protrusions 23 for further enhancing gas-tightness of the annular protrusions 23.

Although the ring joint body 5 and the branch pipe 6 are molded into a united body during the molding of the ring joint 3 in the first embodiment to the fifth embodiment, the ring joint body 5 and the branch pipe 6 of the sixth and seventh embodiments shown in FIG. 7 and FIG. 8 are formed separately, and are fixedly welded in a subsequent process. In the first process of the sixth embodiment for connecting the ring joint 3 and the piping 1, the metal piping 1 with the outer peripheral surface 18 thereof initially rust-proofed, e.g., galvanized, resin coated, has a tip portion thereof fixed to the resin branch pipe 6 by molding. The ring joint body 5 is molded separately from the branch pipe 6.

In the subsequent process, the branch pipe 6 is arranged in contact to the outer peripheral surface of the flow path 27 formed at the side of the ring joint body 5. A welding means such as ultrasonic vibration welding with heat or high frequency induction welding with heat is applied to a welding surface 24 where the branch pipe 6 and the outer peripheral surface of the flow path 27 make contact, and the ring joint body 5 and the branch pipe 6 are then fixedly welded, thereby completing the connection between the ring joint 3 and the piping 1.

Even with the method of molding the ring joint body 5 and the branch pipe 6 separately and then fixedly welding the ring joint body 5 and the branch pipe 6, the connection structure of the ring joint 3 and the piping 1 will have highly reliable gas-tightness and strength, and the fluid between the base member 2 and the piping will flow smoothly in a perpendicularly intersecting direction. Each process can be performed safely and easily, thereby increasing productivity.

In the seventh embodiment, after the ring joint body 5 and the branch pipe 6 are fixedly welded with the same procedure as the sixth embodiment, a seal portion 26, which is formed by seal welding a resin material, is arranged at the outer peripheral surface of the welding surface 24. The welding of the seal portion 26 is easily performed by ultrasonic vibration welding with heat or high frequency induction welding with heat. Although the employment of the seal portion 26 requires more labor for manufacturing and more cost for material than that of the sixth embodiment, the employment of the seal portion 26 further increases connecting strength between the branch pipe 6 and the ring joint body 5, reliability in gas-tightness, and endurance.

In the eighth embodiment to the twelfth embodiment, the ring joint 3 has a disengagement prevention means of the piping 1 for preventing the piping 1 from disengaging from the ring joint 3 even in a case where the piping 1 is subject to a strong disengaging force. In the piping 1 of the eighth embodiment shown in FIG. 9 and FIG. 10, the entire outer peripheral surface 18 of a metal base pipe, preferably a plate film serving as a base, is coated with resin coating. An insertion portion 8 for inserting and connecting to the ring joint 3 has an annular protruded portion 25, in which the annular protruded portion 25 is arranged at a prescribed distance from the tip of the insertion portion 8 in a manner projecting from the outer periphery of the insertion portion S. The portion from the tip of the insertion portion 8 to the annular protruded portion 25 is flat with a substantially equal outer diameter. Although the resin coating 20 of the piping 1 can be applied to the piping 1 in a connection process of the ring joint 3 and the piping 1, this embodiment uses a ready-made piping 1 initially coated entirely with resin coating 20. The labor of applying resin to the piping 1 in the connection process will be unnecessary and a rust-proof effect can be provided to the piping 1 by using the resin coating 20 of the ready-made piping 1 as the resin for welding the ring joint 3 (described afterwards).

Figure 9:
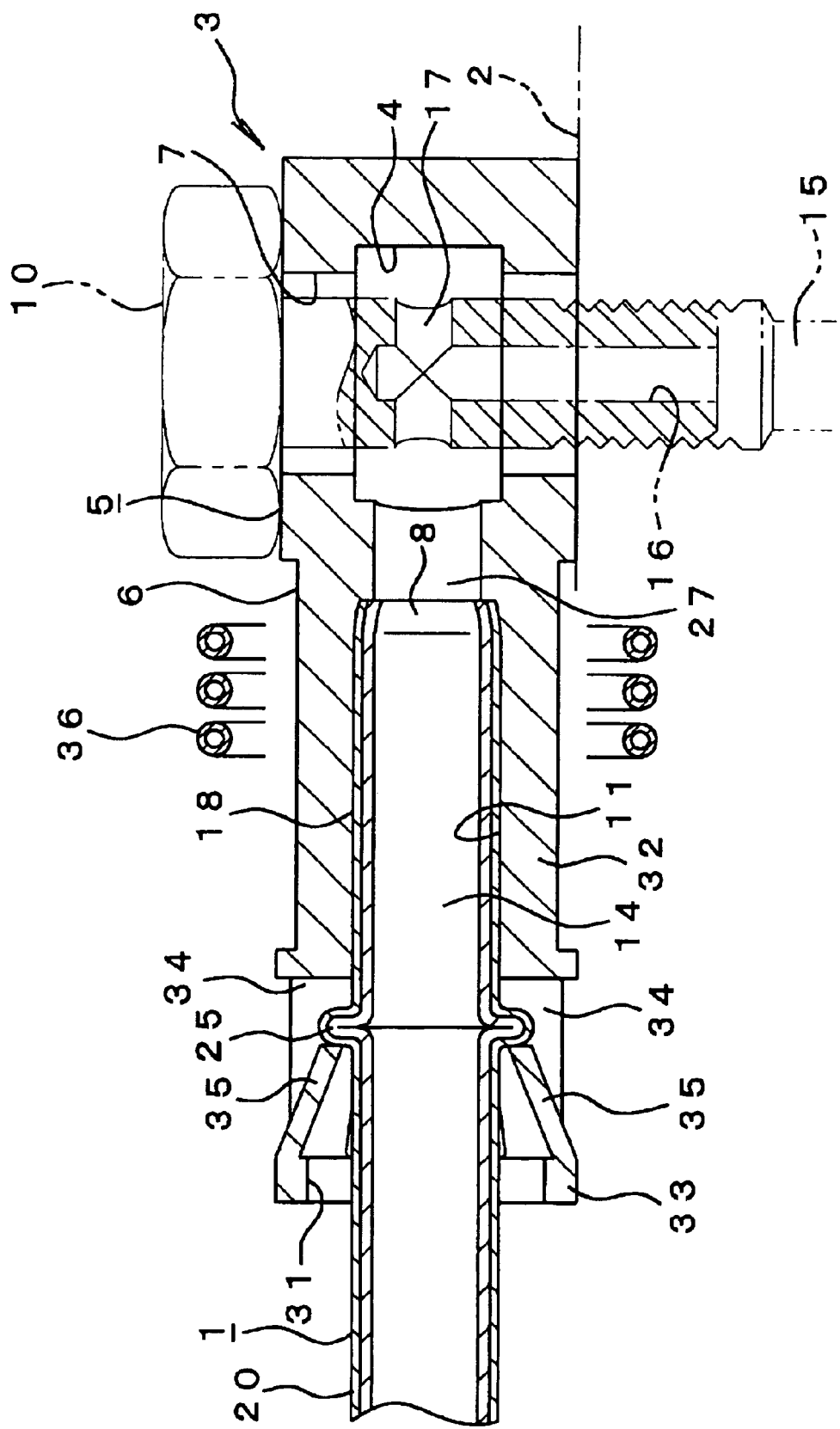
FIG. 9 is a cross-sectional view of the eighth embodiment showing a connection structure of a ring joint and a piping.
Figure 10:
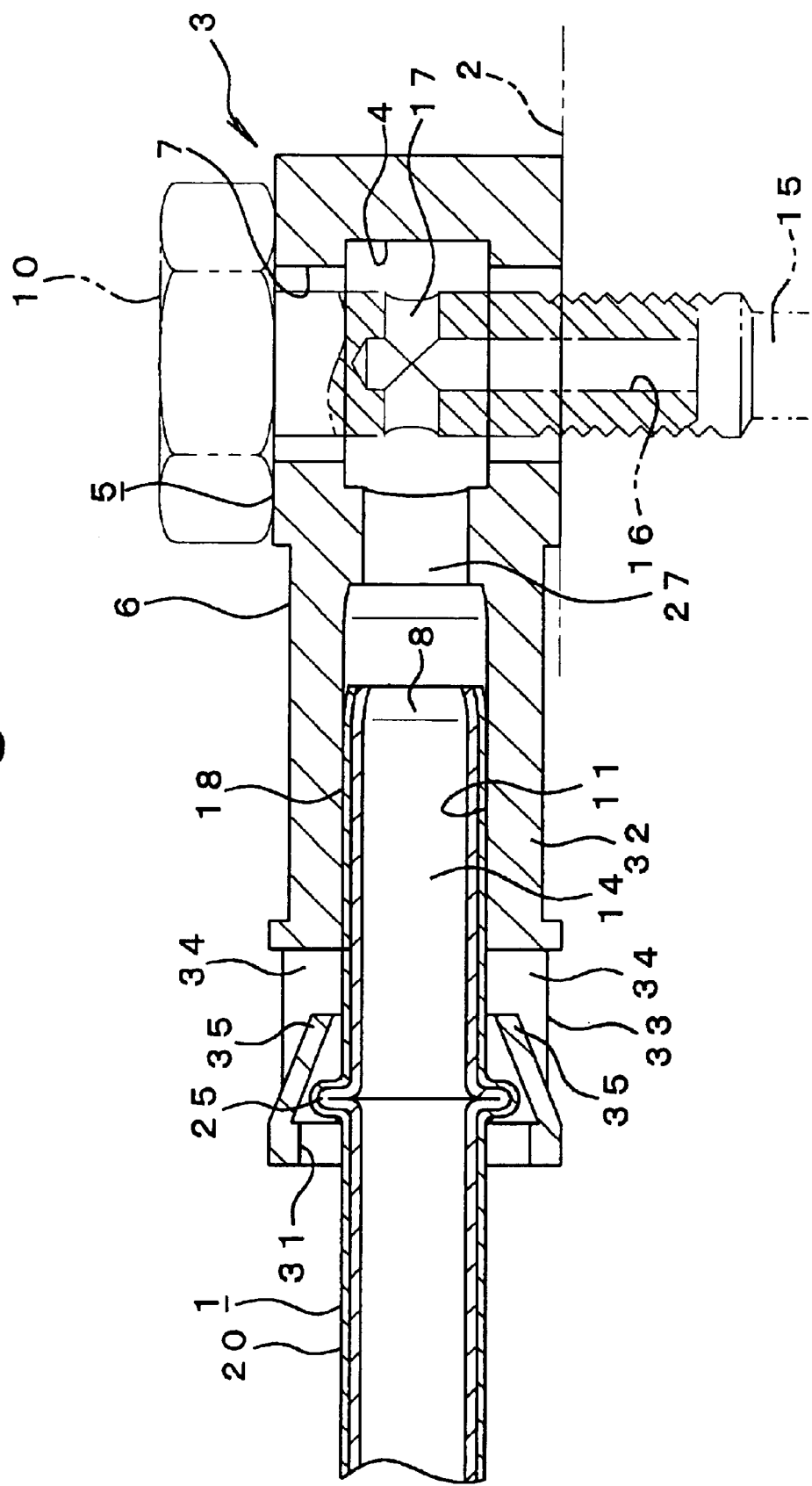
FIG. 10 is a cross-sectional view of the eighth embodiment for showing a course of inserting a piping into a branch pipe.

The ring joint 3 for connecting the piping 1 is entirely molded as a united body with resin. As shown in FIG. 9 and FIG. 10, the eyebolt 10 (illustrated with a dash double dot line in FIG. 9) is pierced through a connectable fitting hole 7, and the flow path 27 in communication with the fitting hole 7 is opened in a direction perpendicularly intersecting with the axial core of the fitting hole 7. The annular recessed groove 4, which is concentric with the fitting hole 7 and in communication with the flow path 27, is arranged inside the ring joint body 5. The flow path 27, the internal bolt communication hole 17 of the eyebolt 10, and the internal bolt communication path 16 of the eyebolt 10 are in fluid communication via the annular recessed groove 4 for allowing fluid to flow between the flow path 27 and the internal bolt communication path 16.

A branch pipe 6 having a cylindrical shape is formed in a projecting manner at the side of the ring joint body 5 and is formed into a united body with the ring joint body 5 to allow communication at the flow path 27 in a direction perpendicularly intersecting with the axial core of the fitting hole 7, thereby enabling the insertion portion 8 of the piping 1 to be inserted and connected to the branch pipe 6 via an insertion hole 31 formed at an end portion of the branch pipe 6. As shown in FIG. 9 and FIG. 10, the branch pipe 11 has a cohering portion 32 having an inner peripheral surface 11 with an inner diameter substantially the same as the outer diameter of the piping 1, has the inner peripheral surface 11 serving as a larger diameter for arranging the annular protruded portion 25 of the piping 1 in continuation from the cohering portion 32, and has a disengagement prevention portion 33 formed with a disengagement prevention means for preventing disengagement of the piping 1, thereby enabling the tip of the insertion portion 8 to be smoothly inserted and adhered toward the ring joint body 5.

The disengagement prevention portion 33 has a pair of notch portions 34 formed at the outer periphery thereof, and an engagement nail 35 is arranged in an inverse tapered manner in a direction from a base portion of the notch portion 34 on side of the insertion hole 31 toward the inner portion of the disengagement prevention portion 33; thereby allowing the engagement nail 35 to engage with a rear surface of the annular protruded portion 25 of the piping 1. By molding together the branch pipe 6, which comprises the cohering portion 32 and the disengagement portion 33, and the ring joint body 5 into a united body with resin, the ring joint 3 can be molded and processed easily, the manufacture cost can be lowered, productivity can be enhanced, and the welding process (described afterwards in the second process) with respect to the piping 1 can be performed easily.

In the first process of connecting the ring joint 3 and the piping 1 in the eighth embodiment shown in FIG. 10, the annular protruded portion 25 contacts against the engagement nail 35 when the insertion portion 8 of the piping 1 is inserted into the branch pipe 6 via the insertion hole 31. The annular protruded portion 25 causes elastic deformation of the engagement nail 25 in an outward direction as the insertion portion is inserted further. After the annular protruded portion 25 surpasses the engagement nail 35 as shown in FIG. 9, the engagement nail 35 returning to original form has a tip face thereof engaged against the back side of the annular protruded portion 25, and the tip side of the insertion portion 8 is inserted and disposed in the into the cohering portion 32 of the branch pipe 6. The engagement of the engagement nail 35 and the annular protruded portion 25 serves as a disengagement prevention means which provides disengagement prevention force for effectively preventing the branch pipe 6 and the piping 1 from disengaging from each other.

A gap between the back side of the annular protruded portion 25 and the tip face of the engagement nail 35 may form due to recoil caused during the surpassing of the annular protruded portion 25 of the piping 1 over the engagement nail 35 or due to slight manufacture error caused during the molding of the annular protruded portion 25 or the engagement nail 35. In a subsequent process of welding resin in such a state, the piping 1 will move toward a disengaging direction when subject to a strong pulling disengagement force, and the resin will peel from the metal of the piping 1 at the welding portion with respect to the branch pipe 6, thereby risking the loss of gas-tightness. In such a case where a gap is formed, the piping 1 can be retracted for ensuring contact between the annular protruded portion 25 and the engagement nail 35, or a spacer for suitably clogging the gap between the annular protruded portion 25 and the engagement nail 35 can be disposed in the gap with no requirement of retracting the piping 1. Accordingly, the gas-tightness and disengagement preventing effect will not be reduced, a high skill precision will not be required in the molding and connecting procedure of the ring joint 3 and the piping 1, and the ring joint 3 and the piping 1 can be manufactured easily at a low cost even when there is a slight manufacture error, for example, in the position of the engagement nail 35 or annular protruded portion 25.

In the second process where the resin at the contacting portion between the inner peripheral surface 11 of the branch pipe 6 and the outer peripheral surface 18 of the piping 1 is welded, this embodiment performs welding only upon the resin of the tip area of the piping 1 instead of performing welding entirely upon the resin of the contacting portion. Therefore, after the insertion portion 8 is inserted in a manner shown in FIG. 9, a high frequency dielectric coil 36 is disposed at the outer periphery of the cohering portion 32, the high frequency dielectric coil 36 heats the metal of the piping 1 for allowing the heat to turn the resin coating 20 at the outer peripheral surface 18 in the tip area of the piping 1 into a molten or semi-molten state.

In such a state, pressure is applied from the outer surface of the cohering portion 32 for fixedly welding the resin of the cohering portion 32 and resin coating 20 of the tip area of the insertion portion 8, thereby completing the procedure of connecting the ring joint 3 and the piping 1. Since connection is performed by the welding of resin, the connection structure provides highly reliable gas-tightness as well as excellent disengagement resistance.

Although high frequency induction welding with heat is employed as the welding means for this embodiment, ultrasonic vibration welding with heat can also be employed. The resin of the contacting portion between the inner peripheral surface 11 of the cohering portion 32 and the outer peripheral surface 18 of the insertion portion 8 can also be welded entirely for welding the branch pipe 6 to the piping 1. Not only can the cohering portion 32 be welded but the resin of the contacting portion between the tip face of the engagement nail 35 and the annular protruded portion 25 can also be welded.

The connection structure between the ring joint 3 and the piping 1 of this invention enables a highly reliable gas-tightness and disengagement resistance for effectively preventing liquid leakage, air leakage or the like, and for enabling fuel, air, lubricants or the like to flow smoothly between the piping 1 and the base member 2 via the ring joint 3. The ring joint 3 can be manufactured with a simple processing method with use of inexpensive resin, the ring joint 3 and the piping 1 can be connected with simple skill of resin welding, and productivity can be improved. The connection structure can ensure safety for the work environment and the human body since no brazing is required.

The ninth embodiment will hereinafter be explained with reference to FIG. 11 and FIG. 12. Although the piping 1 in the eighth embodiment has a substantially equal outer diameter from the tip thereof to the annular protruded portion 25, the piping 1 of the ninth embodiment has a tip side thereof with a narrowed diameter, in which the tapered pipe tip portion 30 has a tip thereof formed with a minimal diameter. In correspondence to the tapered pipe tip portion 30, the inner peripheral surface 11 of the cohering portion 32 of the branch pipe 6 has the tapered inner peripheral surface 28 formed thereto. The positioning between the tip side of the insertion portion 8 and the cohering portion 32 as well as the positioning between the annular protruded portion 25 and the engagement nail 35 can be performed easily and more accurately by inserting the tapered pipe tip portion 30 into the tapered inner peripheral surface 28. After the piping 1 is completely inserted, the inner peripheral surface 11 of the branch pipe 6 can maintain high pressure upon the surface of the tapered pipe tip portion 30 and the annular protruded portion 25 can firmly contact to the engagement nail 35, thereby maintaining an excellent engaged state.

Although the eighth embodiment allows the resin between the piping 1 and the branch pipe 6 to be welded by high frequency dielectric heating after the insertion of the piping 1, the ninth embodiment allows the metal of the piping 1 to be heated by high frequency induction during the insertion of the insertion portion 8 of the piping 1 to the branch pipe 6. The resin of the entire inner peripheral surface 11 of the cohering portion 32, which allows the insertion portion 8 to pass therethrough, is formed into a molten or semi-molten state by the heat. After insertion of the insertion portion 8 is complete, the resin of the entire contacting surface between the outer peripheral surface 18 of the insertion portion 8 and the inner peripheral surface 11 of the cohering portion 32 is welded for providing a more reliable gas-tightness and for enhancing disengagement resistance.

Figure 11:
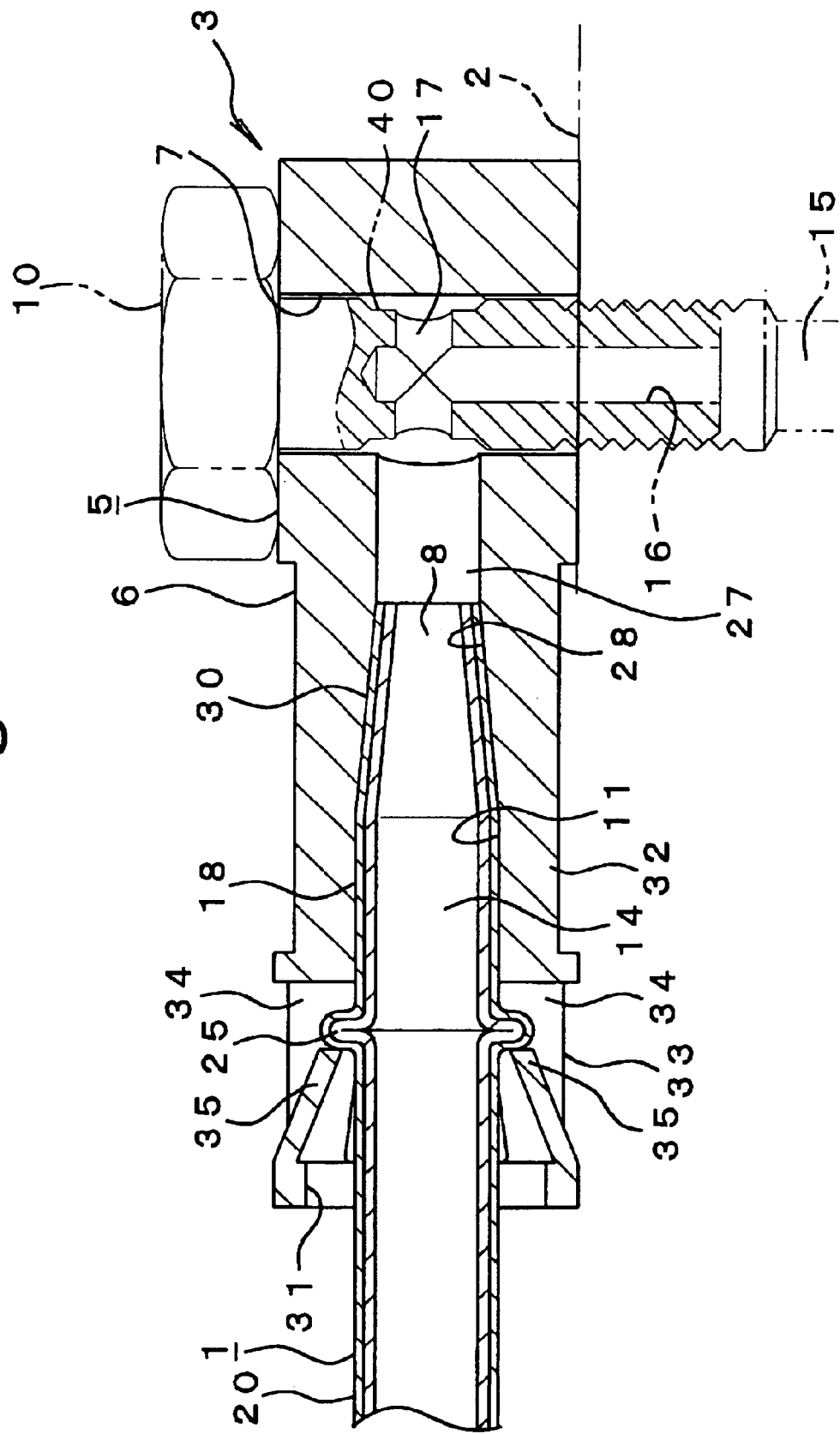
FIG. 11 is a cross-sectional view of the ninth embodiment showing a tapered tip portion arranged at a tip of a piping.
Figure 12:
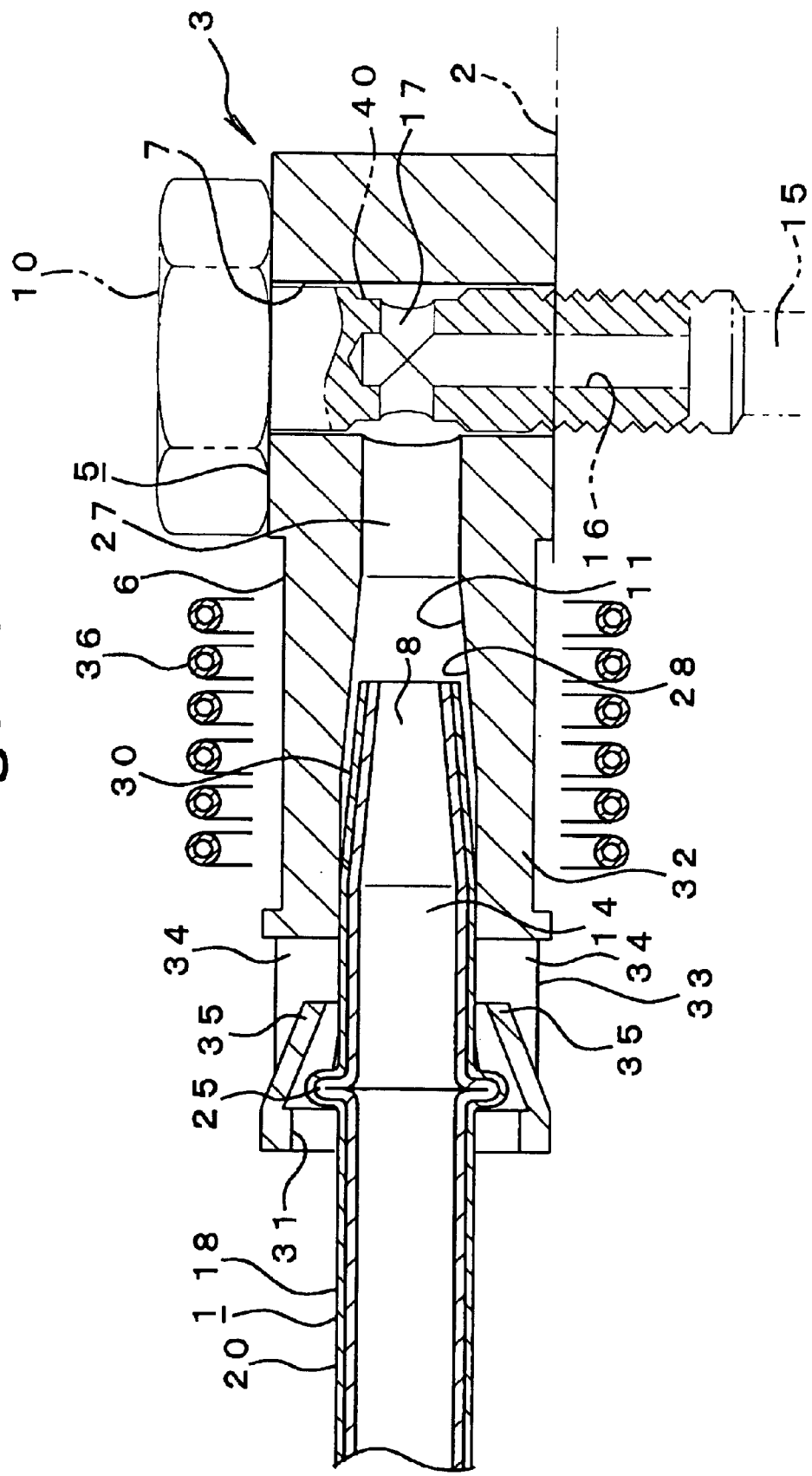
FIG. 12 is a cross-sectional view of the ninth embodiment for showing a course of inserting a piping into a branch pipe.

Although the eighth embodiment has the annular recessed groove 4 formed inside the ring joint body 5, and the flow path 27 of the ring joint body 5 arranged in communication with the internal bolt communication path 16 of the eyebolt 10 via the annular recessed groove 4; the ninth embodiment shown in FIG. 11 and FIG. 12 has only the fitting hole 7 formed inside the ring joint body 5, and the flow path 27 arranged in communication with the internal bolt communication path 16 by disposing an annular recessed groove 40 at the outer periphery of the eyebolt 10.

Although the eighth and ninth embodiments employ a metal piping 1 having the outer peripheral surface 18 thereof coated entirely or partially with the resin coating 20, a rust proofed, e.g., galvanized metal piping 1 may also be employed where the outer peripheral surface at the tip portion of the piping 1 including the annular protruded portion 25 is fitted with a resin tube with an inner surface compound. The resin tube using a resin with a thermal contracting property is heated for contraction after being fitted to the piping 1, thereby allowing the resin tube to be easily fixed cohesively to the outer peripheral surface of the piping 1 in an inseparable manner. Other suitable welding means may be employed as a means for fixing the resin tube to the piping 1, and a means such as applying an adhesive agent may also be employed. By welding the resin between the resin tube disposed on the outer peripheral surface 18 of the piping 1 and the inner peripheral surface 11 of the branch pipe 11, the piping 1 and the ring joint 3 can be connected with excellent gas-tightness.

Although the ring joint body 5 is formed only with resin in the eighth and ninth embodiments, other embodiments may employ a member other than resin, for example, a steel plate may be adherently disposed as a reinforcement member upon the entire inner peripheral surface of the ring joint body, thereby increasing the endurance of the ring joint 3, preventing excessive bending and deformation, and maintaining gas-tightness for a long period.

The tenth and eleventh embodiments will be described in detail hereinafter. The ring joint 3 can be formed with excellent consistency by using engineering plastic such as polyamide for forming the ring joint 3, in which the engagement nail 35 formed in a tapering manner toward the inner direction of the ring joint 3 has an inverse tapered shape. Therefore, attempting to mold the inverse tapered shape engagement nail 35 and the ring joint body 5 with a same metal mold causes problems such as difficulty in removing the inverse tapered portion from the metal mold. Accordingly, in the tenth embodiment shown in FIG. 13 and the eleventh embodiment shown in 14, the engagement nail 35 is formed separately from the ring joint body 5 for allowing each member to be molded easily.

In the tenth embodiment shown in FIG. 13, only the cohering portion 32 of the branch pipe 6 is molded into a united body with the ring joint body 5. The ring joint body 5 is molded separately from the disengagement prevention portion 33, in which the disengagement prevention portion 33 is molded into a united body with the engagement nail 35. After the aforementioned members are molded, the disengagement prevention portion 33 is fixedly welded to the side surface of the cohering portion 32. In comparison with the eighth and ninth embodiments, the metal mold of the ring joint body 5 can be more simplified for enhancing processablitiy of the ring joint body 5, the engagement nail 35 formed in the disengagement prevention portion 33 can be processed more easily for heightening productivity in molding the ring joint 3 and precision in manufacturing the ring joint 3.

Figure 14:
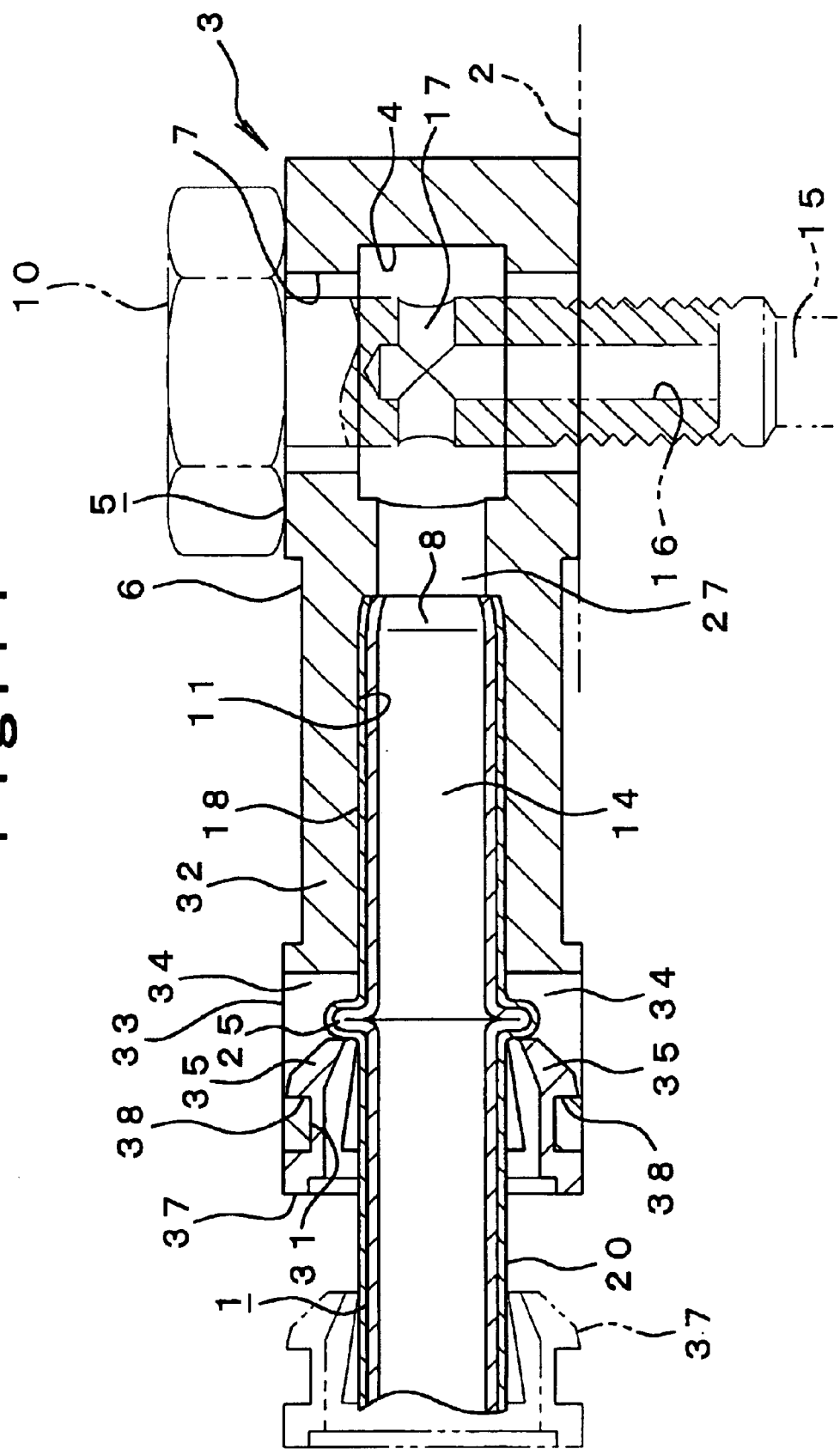
FIG. 14 is a cross-sectional view of the eleventh embodiment showing an engagement nail formed at a clip member and in a separate manner with respect to the main body of a disengagement prevention portion.

In the eleventh embodiment shown in FIG. 14, the branch pipe 6 having no engagement nail 35 formed thereto is molded into a united body with the ring joint body 5, and the disengagement prevention portion 33 of the branch pipe 6 has an opened cylindrical notch portion 34 formed thereto. A clip member 37 having the engagement nail 35 formed thereto is formed separately with respect to the ring joint body 5 having the branch pipe 6 formed thereto. The clip member 37 is fitted into the disengagement prevention portion 33 via the insertion hole 31 as shown in FIG. 14, and has a rear edge face 38 of the engagement nail 35 engaged to the base portion of the notch portion 34 opened in the disengagement prevention portion 33, thereby engaging the clip member 37 to the disengagement prevention portion 33.

Accordingly, the ring joint body 5 of the eleventh embodiment can be molded easily with no the inverse tapered shape required and can be manufactured inexpensively by employing the separate clip member 37 having the engagement nail 35 formed thereto. The clip member 37 can, for example, be formed using the same engineering plastic resin as the branch pipe 6, can be formed using other resin for allowing the engagement nail 35 to be removed from the metal mold, or can be formed by bending of a metal panel. In any of such cases, the engagement nail 35 can be formed with ease and with high precision.

The twelfth embodiment will be described in detail hereinafter with reference to FIG. 15 and FIG. 16. Although the ring joint body 5 and the entire portion or a portion of the branch pipe 6 are molded into a united body during the molding of the ring joint 3 in the eighth to eleventh embodiments, the branch pipe 6 in the twelfth embodiment is formed into a united body with the piping 1 and is formed separately with respect to the ring joint body 5. In a subsequent process, the branch pipe 6 is fixedly welded to the ring joint body 5.

Figure 16:
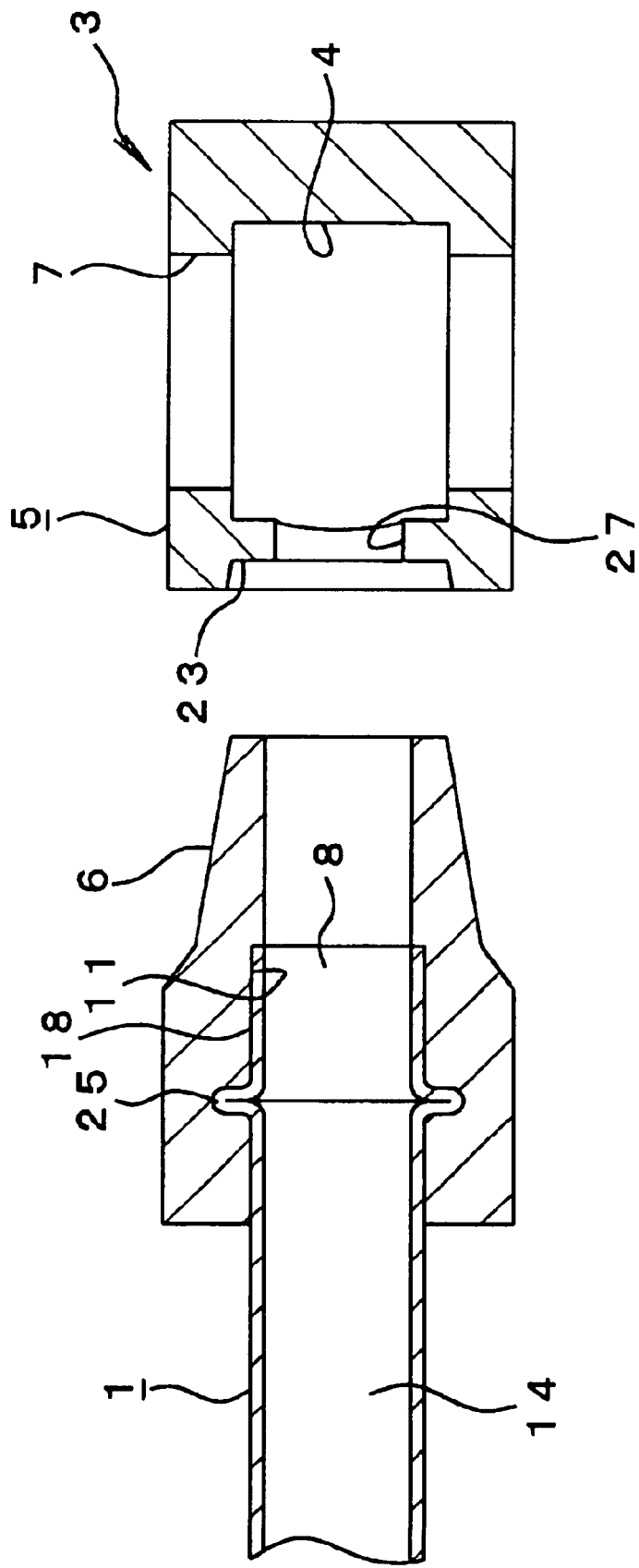
FIG. 16 is a cross-sectional view of the twelfth embodiment showing a state before a branch pipe fixed to a piping is welded to a ring joint body.

In the first process, the annular protruded portion 25 projecting from the outer peripheral surface of the metal piping 1 is disposed at a prescribed distance from the tip of the piping 1 as shown in FIG. 16. A rustproof property can be provided to the metal piping 1 by rustproofing, e.g., galvanizing, the outer peripheral surface 18. The resin branch pipe 6 is fixed to the outer peripheral surface 18 of the insertion portion 8 of the piping 1 including the annular protruded portion 25 and formed into a cylindrical shape by molding. Since the branch pipe 6 is formed to the piping 1 by the molding, the branch pipe 6 and the piping 1 can be connected inseparably with highly reliable gas-tightness without requiring the outer peripheral surface 18 of the piping 1 to be formed with resin. A disengagement prevention means with excellent disengagement resistance can also be provided since the annular protruded portion 25 is buried into the resin of the branch pipe 6.

Figure 15:
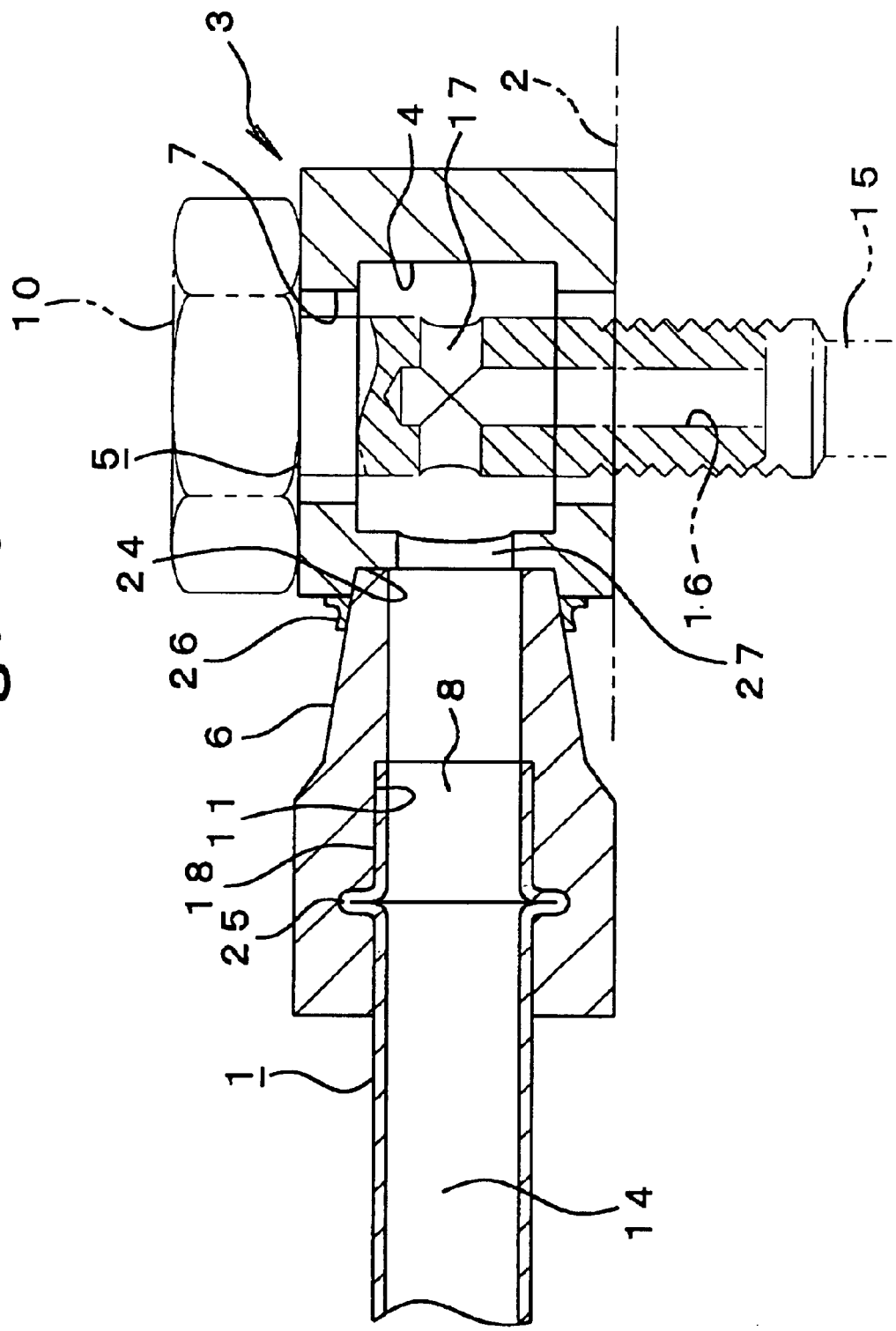
FIG. 15 is a cross-sectional view of the twelfth embodiment showing a state where a branch pipe fixed to a piping by molding is fixedly welded to a ring joint body.

In the second process as shown in FIG. 15, the tip face of the branch pipe 6 is contacted, in a direction perpendicularly intersecting with the eyebolt 10, to the resin welding surface 24 disposed at the side surface of the ring joint body 5. The contacting portion is applied with a welding means such as ultrasonic vibration welding with heat or high frequency welding with heat, thereby fixedly welding the ring joint body 5 and the branch pipe 6 together.

Although the connecting process between the ring joint 3 and the piping 1 is completed by fixedly welding the ring joint body 5 and the branch pipe 6, the twelfth embodiment as shown in FIG. 15 further performs a process of welding a resin material to the outer periphery of the welded portion between the ring joint body 5 and the piping 1 for forming the seal portion 26. The seal portion 26 can also be easily welded by ultrasonic vibration welding with heat or high frequency induction welding with heat. The employment of the seal portion 26 further increases connecting strength between the branch pipe 6 and the ring joint body 5, reliability in gas-tightness, and disengagement resistance.

As shown in the twelfth embodiment, the connection structure between the ring joint 3 and the piping 1 can have a highly reliable gas-tightness and disengagement resistance even by molding the ring joint body 5 and the branch pipe 6 separately, and by fixedly welding the ring joint body 5 and the branch pipe 6 in the subsequent process. Furthermore, the structure of the branch pipe 6 can be simplified with no labor of forming, for example, the engagement nail 35, thereby increasing productivity and ensuring safety for the work environment and the human body.

Since the branch pipe 6 is fixed to the piping 1 by molding, a metal piping 1 having no resin on the outer peripheral surface 18 thereof is employed in the twelfth embodiment; nevertheless, a metal piping 1 having the resin coating 20 or the resin tube cohered on the entire outer peripheral surface 18 thereof or on the outer peripheral surface 18 of the insertion portion 8 may be employed, or a resin piping 1 having a metal tube disposed at the inner peripheral surface including the annular protruded portion 25 may also be employed. The employment of these piping 1 strengthens the integration between the piping 1 and the branch pipe 6 since the resin of the outer peripheral surface 18 and the resin of the branch pipe are welded.

Since connection between a ring joint and a piping e.g., piping for automobiles, various machines, and apparatuses, is performed by welding between resin disposed on the inner peripheral surface of a branch pipe of a ring joint and resin disposed on the outer peripheral surface of a piping or by welding a branch pipe being molded to a piping and a ring joint, this invention can provide a connection structure between ring joint and a piping having a highly reliable gas-tightness, endurance, and a disengagement resistance for preventing the ring joint from disengaging from the piping. By forming a disengagement prevention means in the branch pipe of the ring joint for preventing disengagement of the piping, a greater disengagement resistance can be obtained.

Accordingly, the fluid flowing between the piping and the base member in a perpendicularly intersecting direction via the ring joint can flow smoothly without problems such as leakage. Since the piping and the ring joint are connected by welding of resin instead of brazing of metal, the connection can be performed with an easy method which requires no complicated technique of high skill and no excess processing procedures, and also can prevent harm upon the work environment and the human body. A rust proofed metal piping as well as a resin piping can be employed for further reducing the labor required for connection. Consequently, manufacture of the ring joint as well as connection with the piping can be performed efficiently, thereby, increasing productivity.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A ring joint, comprising:
   a ring joint body having:
      a fitting hole for an eyebolt, the fitting hole being piercingly formed in an axial core portion of said ring joint body and in continuation from an annular recessed groove formed inside the ring joint body, and
      a flow path communicating with the fitting hole and extending in a direction perpendicularly intersecting with an axial core of the fitting hole; and
   a branch pipe formed as a unitary body with the ring joint body and arranged in a direction perpendicular to and intersecting with the eyebolt for insertion to the annular recessed groove,
   wherein the ring joint is formed of resin at least at the branch pipe,
   wherein the ring joint can be connectable with a piping by inserting the piping into the branch pipe of the ring joint body,
   wherein the piping has an outer peripheral surface covered with resin at least at a portion contacting to the branch pipe, and
   wherein the piping is fixedly welded to an inner peripheral surface of the branch pipe via the resin of the outer peripheral surface of the piping.

2. The ring joint according to claim 1, wherein the piping is welded by welding means to the inner peripheral surface of the branch pipe via the resin of the outer peripheral surface of the piping.

3. The ring joint according to claim 2, wherein the welding means is an ultrasonic vibration welding means using heat or a high frequency induction welding means using heat.

4. A connection structure for connecting a ring joint and a piping comprising:
   a ring joint body having:
      a fitting hole for an eyebolt, the fitting hole being piercingly formed in an axial core portion of the ring joint body and in continuation from an annular recessed groove formed inside the ring joint body, and
      a flow path communicating with the fitting hole and extending in a direction perpendicularly intersecting with an axial core of the fitting hole; and
   a branch pipe formed as a united body with the ring joint body and arranged in a direction perpendicular to and intersecting with the eyebolt for insertion to the annular recessed groove,
   wherein the ring joint is formed of resin at least at the branch pipe,
   wherein the ring joint can be connected with a piping by inserting the piping into the branch pipe of the ring joint body, wherein the piping has an outer peripheral surface covered with resin at least at a portion contacting to the branch pipe, and wherein the piping is fixedly welded to an inner peripheral surface of the branch pipe via the resin of the outer peripheral surface of the piping.

5. The connection structure for connecting a ring joint and a piping according to claim 4, wherein the piping is welded by welding means to the inner peripheral surface of the branch pipe via the resin of the outer peripheral surface of the piping.

6. The connection structure for connecting a ring joint and a piping according to claim 5, wherein the welding means is an ultrasonic vibration welding means using heat or a high frequency induction welding means using heat.

7. The ring joint according to claim 6, wherein the welding means is an ultrasonic vibration welding means using heat or a high frequency induction welding means using heat.

8. A ring joint, comprising:
   a ring joint body having:
      a fitting hole for an eyebolt, the fitting hole being piercingly formed in an axial core portion of the ring joint body, and
      a flow path communicating with the fitting hole and extending in a direction perpendicularly intersecting with an axial core of the fitting hole; and
   a branch pipe formed as a unitary body with an outer peripheral surface of the ring joint body and arranged in a direction perpendicular intersecting with the axial core of the fitting hole,
   wherein the branch pipe is in communication with the flow path,
   wherein the ring joint body can be connectable with a piping by inserting the piping into the branch pipe of the ring joint body,
   wherein the piping has resin formed at an outer peripheral surface of an insertion portion of the piping,
   wherein the branch pipe has resin formed at an inner peripheral surface of the branch pipe contacting to the outer peripheral surface of the insertion portion of the piping,
   wherein the branch pipe has an engagement nail formed at an inner surface thereof as a unitary body or as a separate body with respect to the branch pipe,
   wherein the engagement nail serving as a disengagement prevention means for the piping is engaged to an annular protruded portion,
   wherein the annular protruded portion is formed on the outer peripheral surface of the piping at a prescribed distance from a tip of the insertion portion, and
   wherein the resin of the inner peripheral surface of the branch pipe and the resin of the outer peripheral surface of the piping are fixedly welded.

9. The ring joint according to claim 8, wherein the resin of the inner peripheral surface of die branch pipe and the resin of the outer peripheral surface of the piping are welded by welding means.

10. A connection structure for connecting a ring joint and a piping, comprising:
    a ring joint body having:
       a fitting hole for an eyebolt, the fitting hole being piercingly formed in an axial core portion of the ring joint body, and
       a flow path communicating with the fitting hole and extending in a direction perpendicularly intersecting with an axial core of the fitting hole; and
    a branch pipe formed as a united body with an outer peripheral surface of the ring joint body and arranged in a direction perpendicular to and intersecting with the axial core of the fitting hole, the branch pipe communicating with the flow path,
    wherein the ring joint body can be connected with a piping by inserting the piping into the branch pipe of the ring joint body,
    wherein the piping has resin formed at an outer peripheral surface of an insertion portion of the piping,
    wherein the branch pipe has resin formed at an inner peripheral surface of the branch pipe contacting to the outer peripheral surface of the insertion portion of the piping,
    wherein the branch pipe has an engagement nail formed at an inner surface thereof, as a unitary body or as a separate body with respect to the branch pipe,
    wherein the engagement nail serving as a disengagement prevention means for the piping is engaged to an annular protruded portion, formed on the outer peripheral surface of the piping at a prescribed distance from a tip of the insertion portion, and
    wherein the resin of the inner peripheral surface of the branch pipe and the resin of the outer peripheral surface of the piping are fixedly welded.

11. The connection structure for connecting a ring joint and a piping according to claim 10, wherein the resin of the inner peripheral surface of the branch pipe and the resin of the outer peripheral surface of die piping are welded by welding means.

12. The connection structure for connecting a ring joint and a piping according to claim 11, wherein the welding means is an ultrasonic vibration welding means using heat or a high frequency induction welding means using heat.

13. A method of connecting a ring joint and a piping, comprising the steps of:
    forming a disengagement prevention means for a piping by inserting the piping into a branch pipe of a ring joint body and engaging an annular protruded portion of the piping with an engagement nail formed at an inner surface of the branch pipe, the piping having resin formed at an outer peripheral surface of an insertion portion of the piping, the annular protruded portion being formed on the outer peripheral surface of the piping at a prescribed distance from a tip of the insertion portion, the engagement nail formed as a united body or as a separate body with respect to the branch pipe; and
    fixedly welding the resin of the branch pipe and the resin of the outer peripheral surface of the piping with a welding means, the resin of the branch pipe is formed at an inner peripheral surface of the branch pipe contacting to the outer peripheral surface of the insertion portion of the piping,
    whereby the ring joint body and the piping are connected.

14. The method of connecting a ring joint and a piping according to claim 13, wherein the resin of the branch pipe is welded to the resin of the outer peripheral surface of die piping by welding means, the welding means being an ultrasonic vibration welding means using heat or a high frequency induction welding means using heat.

15. A connection structure far connecting a ring joint and a piping comprising:
    a ring joint body having:
       a fitting hole for an eyebolt, the fitting hole being piercingly formed in an axial core portion of the ring joint body, and A flow path communicating with the fitting hole and extending in a direction perpendicular to and intersecting with an axial core of the fitting hole; and a piping having a disengagement prevention means by forming an annular protruded portion on an outer peripheral surface thereof in the side of the piping for connecting to the ring joint body, and by fixing a cylindrical branch pipe to the outer peripheral surface including the annular protruded portion by molding, wherein the cylindrical branch pipe is formed with resin and is fixedly welded to a resin welding surface of the ring point body in a direction perpendicular to and intersecting with the axial core of the fitting hole and in communication with the flow path such that the cylindrical branch pipe protrudes from a side of the ring joint body; and wherein the branch pipe formed with resin is welded to a resin welding surface of the ring joint body by welding means, the welding means being an ultrasonic vibration welding means using heat or a high frequency induction welding means using heat.

16. Connection structure for connecting a ring joint and a piping comprising:

a ring joint body having:
a fitting hole for an eyebolt, the fitting hole being piercingly formed in an axial core portion of the ring joint body and in continuation from an annular recessed groove formed inside the ring joint body, and
a flow path communicating with the fitting hole and extending in a direction perpendicular to and intersecting with an axial core of the fitting hole; and a piping having a cylindrical branch pipe fixed to an end portion of the piping, wherein the cylindrical branch pipe is formed with resin and is fixedly welded to the ring joint body in a direction perpendicular to and intersecting with the eyebolt such that the cylindrical branch pipe protrudes from a side of the ring wherein the eyebolt is connected to the annular recessed grove of the ring joint body, and wherein the branch pipe formed with resin is welded to the ring joint body by welding means, the welding means being an ultrasonic vibration welding means using heat or a high frequency induction welding means using heat.

17. Connection structure for connecting a ring joint and a piping comprising:

a ring joint body having:
a fitting hole for an eyebolt, the fitting hole being piercingly formed in an axial core portion of the ring joint body and in continuation from an annular recessed groove formed inside the ring joint body, and
a flow path communicating with the fitting hole and extending in a direction perpendicular to and intersecting with an axial core of the fitting hole; and a piping having a cylindrical branch pipe fixed to an end portion of the piping, wherein the cylindrical branch pipe is formed with resin and is fixedly welded to the ring joint body in a direction perpendicular to and intersecting with the eyebolt such that the cylindrical branch pipe protrudes from a side of the ring joint body, wherein the eyebolt is connected to the annular recessed groove of the ring joint body, and wherein the branch pipe us fixed to the end portion of the piping by molding.

18. Connection structure for connecting a ring joint and a piping comprising:

a ring joint body having:
a fitting hole for an eyebolt, the fitting hole being piercingly formed in an axial core portion of the ring joint body and in continuation from an annular recessed groove formed inside the ring joint body, and
a flow path communicating with the fitting hole and extending in a direction perpendicular to and intersecting with an axial core of the fitting hole; and a piping having a cylindrical branch pipe fixed to an end portion of the piping, wherein the cylindrical branch pipe is formed with resin and is fixedly welded to the ring joint body in a direction perpendicular to and intersecting with the eyebolt such that the cylindrical branch pipe protrudes from a side of the ring joint body, wherein the eyebolt is connected to the annular recessed groove of the ring joint body, and wherein the cylindrical branch pipe is formed as a unitary body with the ring joint body.

* * * * *